US 6,707,498 B1

(12) United States Patent
Toma et al.

(10) Patent No.: US 6,707,498 B1
(45) Date of Patent: Mar. 16, 2004

(54) CHARGE TRANSFER OF SOLID-STATE IMAGE PICKUP DEVICE

(75) Inventors: Tetsuo Toma, Miyagi (JP); Tetsuo Yamada, Miyagi (JP); Masashi Inuiya, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/188,885

(22) Filed: Nov. 10, 1998

(30) Foreign Application Priority Data

Nov. 11, 1997 (JP) ............................................. 9-309037
Nov. 11, 1997 (JP) ............................................. 9-309038

(51) Int. Cl.[7] ........................ H04N 5/335; H04N 5/235
(52) U.S. Cl. ...................... 348/311; 348/314; 348/322; 348/230.1
(58) Field of Search ................... 348/311, 312, 348/314, 322, 324, 230.1, 239

(56) References Cited

U.S. PATENT DOCUMENTS

| 4,684,993 | A | * | 8/1987 | Berger et al. ............... 348/324 |
| 5,396,290 | A | * | 3/1995 | Kannegundla et al. ...... 348/312 |
| 5,486,859 | A | * | 1/1996 | Matsuda ..................... 348/311 |
| 5,528,291 | A | | 6/1996 | Oda .......................... 348/220 |
| 5,608,455 | A | | 3/1997 | Oda .......................... 348/245 |
| 5,874,993 | A | * | 2/1999 | Ciccarelli et al. ........... 348/314 |
| 5,900,909 | A | * | 5/1999 | Parulski et al. ............. 348/239 |
| 6,204,879 | B1 | * | 3/2001 | Koseki et al. ............. 348/230.1 |
| 6,400,404 | B2 | * | 6/2002 | Hirota et al. ............... 348/314 |

FOREIGN PATENT DOCUMENTS

| JP | 03-173288 | 7/1991 |
| JP | 03-222582 | 10/1991 |
| JP | 05-199452 | 8/1993 |
| JP | 5-199464 | 8/1993 |

* cited by examiner

Primary Examiner—Wendy R. Garber
Assistant Examiner—Lin Ye
(74) Attorney, Agent, or Firm—Sughrue Mion, PLLC

(57) ABSTRACT

An image signal processing apparatus includes: a solid-state image pickup device capable of taking a two-dimensional image, the device having a plurality of primary transfer paths and a secondary transfer path, wherein the plurality of primary first transfer each have a plurality of transfer stages each capable of storing electric charges and transfer the electric charges in a first direction, and the secondary transfer path has a plurality of transfer stages each capable of storing electric charges, receives electric charges in the plurality of primary transfer paths, and transfers the electric charges in a second direction; a reading unit for scanning the two-dimensional image on the solid-state image pickup device in a main scan direction corresponding to the second direction and in a sub-scan direction corresponding to the first direction and reading the electric charges in the secondary-transfer path as image signals; and an output unit for outputting the read image signals on a monitor by interchanging the main scan direction and the sub-scan direction.

3 Claims, 20 Drawing Sheets

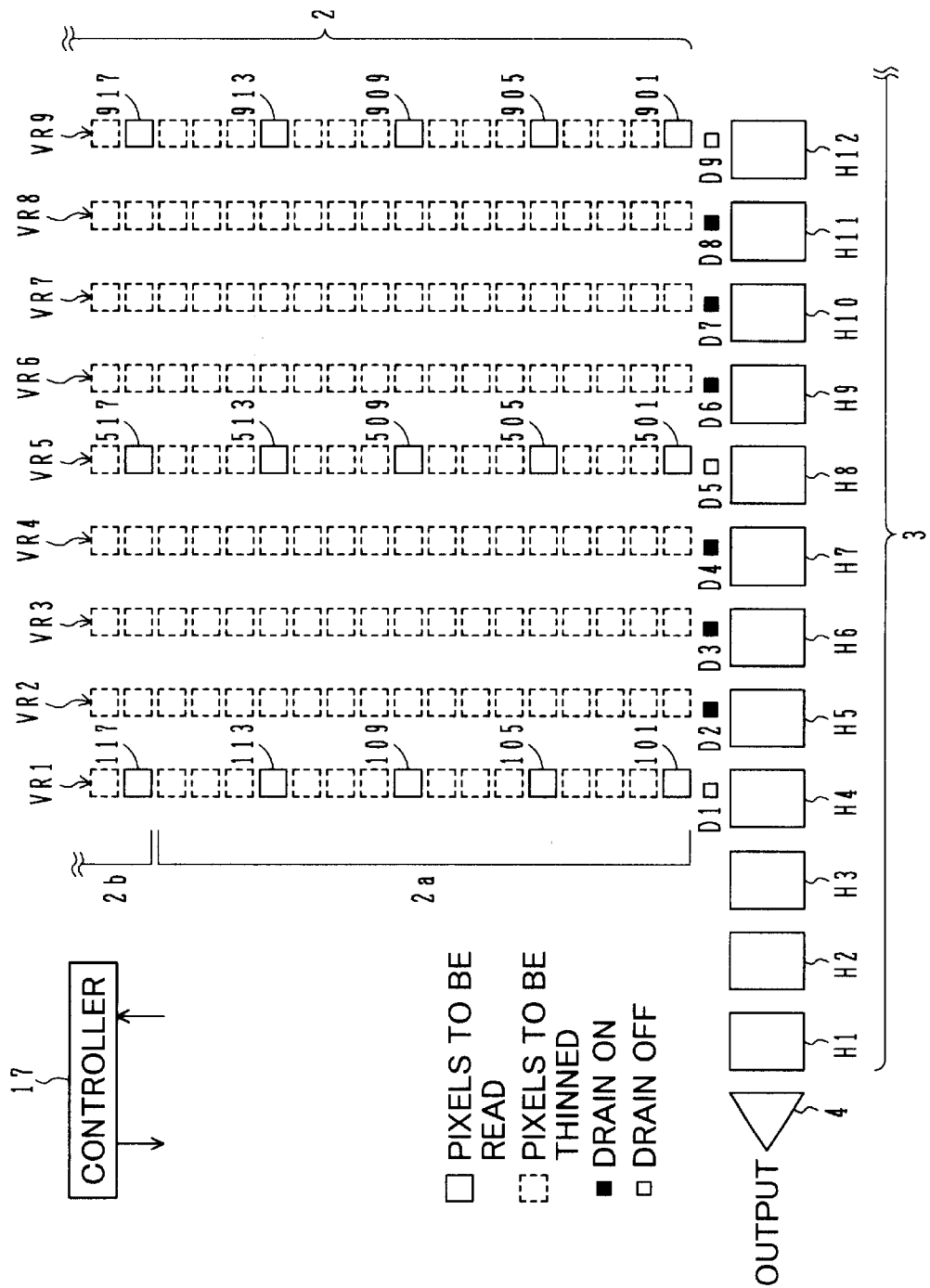

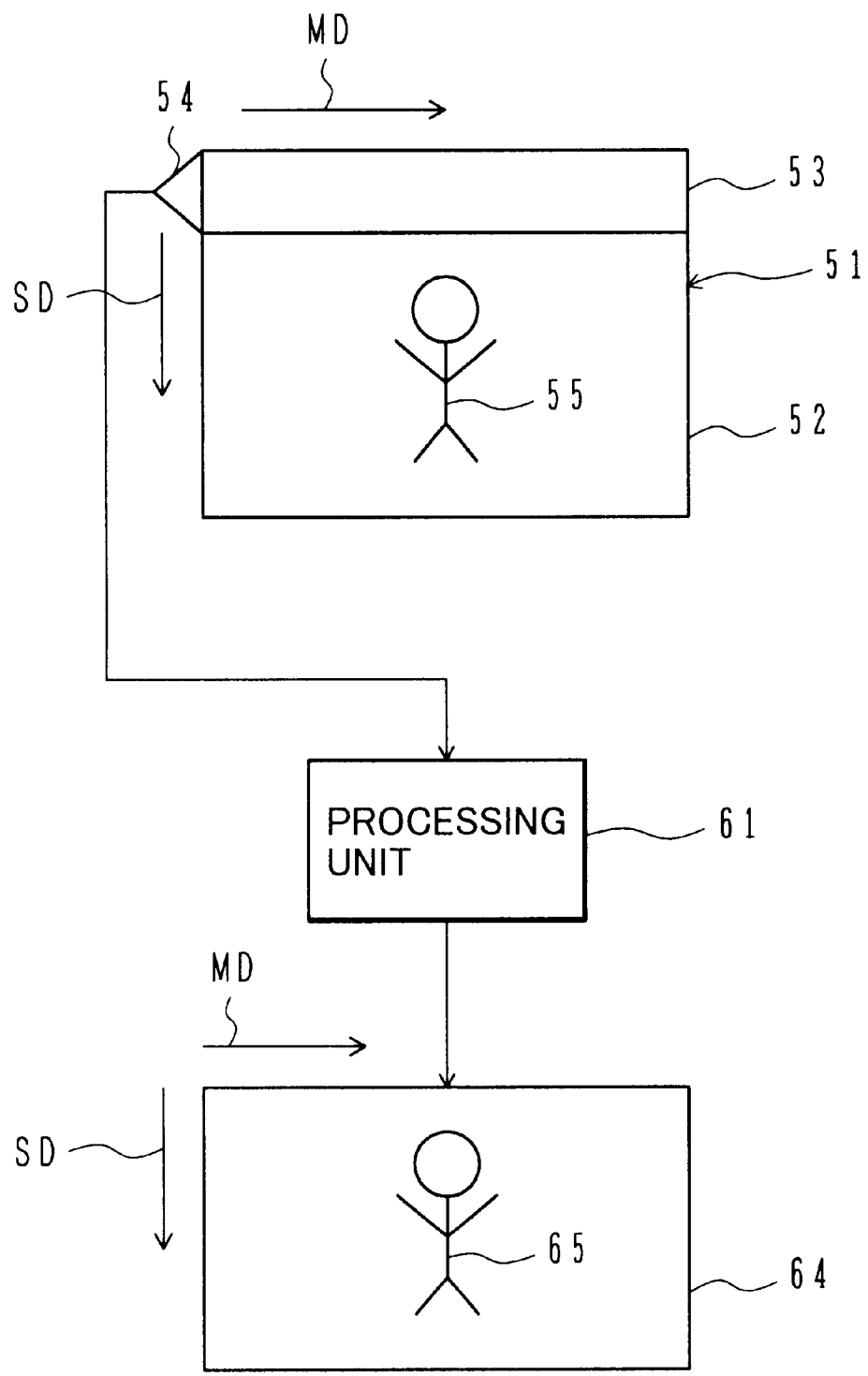

POTENTIAL

US 6,707,498 B1

CHARGE TRANSFER OF SOLID-STATE IMAGE PICKUP DEVICE

This application is based on Japanese patent applications No. 9-309037 filed on Nov. 11, 1997, and No. 9-309038 filed on Nov. 11, 1997, the entire contents of which are incorporated herein by reference.

BACKGROUND OF THE INVENTION a) Field of the Invention

The present invention relates to a solid-state image pickup device, and more particularly to techniques of transferring electric charges accumulated in a solid-state image pickup device and techniques of processing an image signal picked up with a solid-state image pickup device.

b) Description of the Related Art

FIG. 18 is a schematic diagram showing the structure of a conventional image signal processing apparatus.

A solid-state image pickup device 51 has a pixel field 52 and a horizontal transfer path 53. The pixel field 52 has photodiodes disposed two-dimensionally and a plurality of vertical transfer paths.

An image 55 is picked up in the pixel field 52. Each photodiode converts a light signal of the picked-up image 55 into electric charges which are passed from the photodiode to the vertical transfer path wherein the electric charges are transferred in the vertical direction.

The horizontal transfer path 53 receives electric charges of one row (a train of pixels in the horizontal direction) from a plurality of vertical transfer paths and transfers the electric charges in the horizontal direction. An amplifier 54 amplifies the electric charges transferred from the horizontal transfer path 53 and outputs them to a processing unit 61. Next, the horizontal transfer path 53 receives electric charges of the next row from a plurality of vertical transfer paths and transfers them in the horizontal direction. Similar operations are repeated thereafter to output two-dimensional image signals to the processing unit 61.

A flow of electric charges representative of image information will be described. Electric charges read from photodiodes are first passed to the vertical transfer path which is a primary transfer path for transferring electric charges in the vertical direction. Next, the electric charges are passed to the horizontal transfer path which is a secondary transfer path for transferring electric charges in the horizontal direction.

The charge transfer described above corresponds to an image scan like a raster scan. First, electric charges are scanned in the horizontal direction or main scanning direction MD, and then scanned in the vertical direction or sub-scanning direction SD. Electric charges of the next row are again scanned in the main scanning direction (horizontal direction) MD. These scans are repeated to scan the two-dimensional image 55.

The amplifier 54 outputs analog electric signals to the processing unit 61. The processing unit 61 has an A/D converter, a D/A converter, and the like to convert the analog electric signals into digital electric signals which are processed in a predetermined manner and converted into analog electric signals to be output to a monitor 64.

The monitor 64 displays an image 65 through raster scanning. More specifically, scanning in the image horizontal direction or main scanning direction MD is first performed and then scanning in the vertical direction or sub-scanning direction SD is performed. Scanning in the main scanning direction (image horizontal direction) MD is again performed for the next line. These scans are repeated to display the two-dimensional image 65 on the monitor 64.

The main scanning direction MD and sub-scanning direction SD of the solid-state image pickup device 51 are equivalent to the main scanning direction MD and sub-scanning direction SD of the monitor 64.

FIGS. 19A and 19B are schematic diagrams illustrating conventional interlace-scanning image signal processing. The interlace-scanning forms one frame by two fields, an A field FA and a B field FB. In FIGS. 19A and 19B, the A field FA is shown as a hatched area.

FIG. 19A is a schematic diagram illustrating the interlace-scanning of a solid-state image pickup device 51 which corresponds to the solid-state image pickup device 51 in FIG. 18 turned upside down. The A field FA constituted of a collection of odd rows is first scanned on the solid-state image pickup device 51, and then the B field constituted of a collection of even rows is scanned. One row is a train of pixels to be scanned in the main scanning direction (image horizontal direction) MD. The position in the sub-scanning direction (image vertical direction) SD determines whether the scanned row is the A field FA or B field FB.

FIG. 19B is a schematic diagram illustrating the interlace-scanning on the monitor 54. The A field FA constituted of a collection of odd rows is first scanned on the monitor 54, and then the B field constituted of a collection of even rows is scanned. One row is a train of pixels to be scanned in the main scanning direction (image horizontal direction) MD. A position along the sub-scanning direction (image vertical direction) SD determines whether the scanned row is the A field FA or B field FB.

SUMMARY OF THE INVENTION

It is an object of the present invention to provide a solid-state image pickup device and a charge transfer method capable of efficiently transferring electric charges accumulated in the solid-state image pickup device.

It is another object of the present invention to provide a solid-state image pickup device and a charge transfer method capable of efficiently transferring electric charges of thinned image signals.

It is another object of the present invention to provide an image signal processing apparatus and method capable of reading, at high speed, image signals of an image formed on a solid-state image pickup device.

According to one aspect of the present invention, there is provided a solid-state image pickup device comprising: a plurality of first transfer paths each having a plurality of transfer stages each capable of storing electric charges and transferring the electric charges in a first direction; a second transfer path having a plurality of transfer stages each capable of storing electric charges, receiving electric charges in the plurality of first transfer paths, and transferring the electric charges in a second direction; and charge transfer means for transferring electric charges of two packets or more stored in different transfer stages of at least one first transfer path among the plurality of first transfer paths, to different transfer stages of the second transfer path, and transferring the electric charges of the two packets or more in the second transfer path in the second direction by separating the electric charges of the two packets or more.

After the electric charges of two packets or more in each of the first transfer paths are transferred to the second transfer path, the electric charges in the second transfer path are transferred. Accordingly, as compared to the case wherein after the electric charges of one packet in each of the first transfer paths are transferred to the second transfer path, the electric charges in the second transfer path are transferred, a more efficient transfer of the electric charges in the second direction becomes possible because the number of empty transfer stages of the second transfer path reduces.

According to another aspect of the present invention, there is provided a solid-state image pickup device comprising: first transfer paths capable of transferring electric charges in a first direction; a second transfer path capable of receiving the electric charges in the first transfer paths and transferring the electric charges in a second direction; and drains for controlling whether the electric charges in the first transfer paths are to be transferred to the second transfer path by selectively draining the electric charges.

Whether the electric charges in the first transfer paths are to be transferred to the second transfer path can be controlled by selectively draining the electric charges. It is therefore possible to generate image signals with desired pixels being thinned.

According to another aspect of the present invention, there is provided an image signal processing apparatus comprising: a solid-state image pickup device capable of taking a two-dimensional image, the device having a plurality of primary transfer paths and a secondary transfer path, wherein the plurality of primary first transfer each have a plurality of transfer stages each capable of storing electric charges and transfer the electric charges in a first direction, and the secondary transfer path has a plurality of transfer stages each capable of storing electric charges, receives electric charges in the plurality of primary transfer paths, and transfers the electric charges in a second direction; read means for scanning the two-dimensional image on the solid-state image pickup device in a main scan direction corresponding to the second direction and in a sub-scan direction corresponding to the first direction and reading the electric charges in the secondary transfer path as image signals; and output means for outputting the read image signals on a monitor by interchanging the main scan direction and the sub-scan direction.

In the solid-state image pickup device, the smaller the number of primary transfer paths (horizontal pixels), the electric charges can be transferred at higher speed in the first direction, For example, a laterally long two-dimensional image, typically the NTSC format, has generally the number of horizontal pixels greater than the number of vertical pixels. A conventional solid-state image pickup device has the number of horizontal pixels greater than that of vertical pixels in conformity with the NTSC format or the like. In this invention, the number of horizontal pixels of a solid-state image pickup device is made greater than that of vertical pixels. It is therefore possible to read electric charges from the solid-state image pickup device at high speed without lowering the resolution. In outputting the image signals to a monitor, the main scanning and sub-scanning directions are interchanged so that a laterally long image of the NTSC format or the like having the number of horizontal pixels greater than that of vertical pixels can be displayed on the monitor.

According to another aspect of the present invention, there is provided an image signal processing method for a solid-state image pickup device capable of taking a two-dimensional image, the device having primary transfer paths for transferring electric charges in a first direction and a secondary transfer path for receiving the electric charges from the primary transfer paths and transferring the electric charges in a second direction, the image signal processing method comprising the steps of: (a) scanning the two-dimensional image on the solid-state image pickup device in a main scan direction corresponding to the second direction and in a sub-scan direction corresponding to the first direction and reading the electric charges in the secondary transfer path as image signals; and (b) outputting the read image signals on a monitor by interchanging the main scan direction and the sub-scan direction.

BRIEF DESCRIPTION OF THE DRAWINGS

FIG. 7 is a plan view illustrating an operation of a solid-state image pickup device when image signals of an A field are read.

FIG. 9A is a schematic diagram showing an array of pixels on a solid-state image pickup device, FIG. 9B is a schematic diagram showing an array of pixels in a frame memory, and FIG. 9C is a schematic diagram showing an array of pixels on a monitor.

FIG. 18 is a schematic diagram showing the structure of a conventional image signal processing apparatus.

DETAILED DESCRIPTION OF THE PREFERRED EMBODIMENTS

Figure 1:
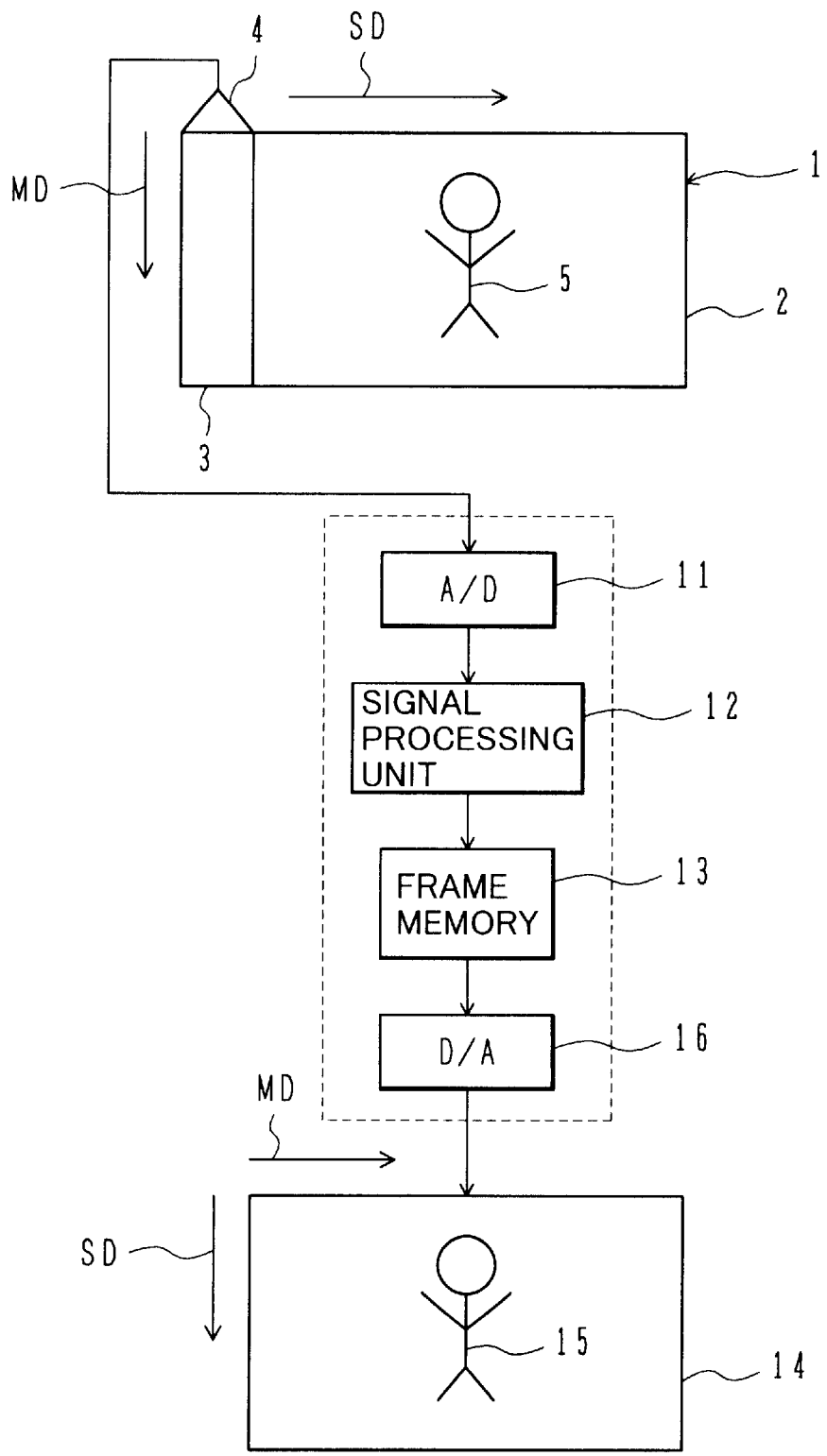
FIG. 1 is a schematic diagram showing the structure of an image signal processing apparatus according to an embodiment of the invention.

FIG. 1 is a schematic diagram showing the structure of an image signal processing apparatus according to an embodiment of the invention.

A solid-state image pickup device 1 uses a main scanning direction MD and a sub-scanning direction SD respectively rotated by 90° from those of the solid-state image pickup device 51 shown in FIG. 18. As compared to the solid-state image pickup device 51 shown in FIG. 18, electric charges can be read from the solid-state image pickup device 1 at higher speed. The reason for this will be later described.

Since the solid-state image pickup device 1 is set at a position rotated by 90°, if an image is displayed on a monitor without any coordinate conversion, the image rotated by 90° is displayed. Pixel position conversion is therefore necessary to interchange the horizontal and vertical directions of an image. The details of pixel position conversion will be given below.

The solid-state image pickup device 1 has a pixel field 2, a horizontal transfer path 3, and an amplifier 4. The pixel field 2 has photodiodes disposed two-dimensionally and a plurality of vertical transfer paths. Since the terms of vertical transfer paths and horizontal transfer path are generally used for a solid-state image pickup device, in this specification, a transfer path for transferring electric charges supplied from photodiodes is called a vertical transfer path, and a transfer path for transferring electric charges supplied from the vertical transfer paths to the amplifier 4 is called a horizontal transfer path. Also, in the solid-state image pickup device 1, a direction (horizontal direction in FIG. 1) along which the vertical transfer path transfers electric charges is called a vertical direction, and a direction (vertical direction in FIG. 1) along which the horizontal transfer path 3 transfers electric charges is called a horizontal direction.

In the solid-state image pickup device 1, the number of pixels in the vertical direction is greater than that in the horizontal direction. An image 5 is picked up in the pixel field 2. An image horizontal direction (horizontal direction in FIG. 1) corresponds to the vertical direction of the solid-state image pickup device 1, and an image vertical direction (vertical direction in FIG. 1) corresponds to the horizontal direction of the solid-state image pickup device 1.

Each photodiode converts a light signal of a picked-up image 5 into electric charges. The electric charges are passed from the photodiodes to the vertical transfer paths which transfer the electric charges in the vertical direction. The photodiodes and vertical transfer paths will be detailed later with reference to FIG. 3.

The horizontal transfer path 3 receives electric charges of one row (a train of pixels in the horizontal direction in FIG. 1) from a plurality of vertical transfer paths and transfers the electric charges in the horizontal direction (vertical direction in FIG. 1). The amplifier 4 amplifies the electric charges transferred by the horizontal transfer path 3 and outputs them to an A/D converter 11. Next, the horizontal transfer path 3 receives electric charges of the next row from the plurality of vertical transfer paths and transfers them in the horizontal direction. Similar operations are repeated thereafter to output two-dimensional image signals to the A/D converter 11.

In the above-described charge transfer, a main scanning direction MD and a sub-scanning direction SD are different with respect to raster scanning of the monitor 14. Namely, scanning in the image vertical direction is performed as the main scanning direction MD. Next, scanning in the image horizontal direction is performed as the sub-scanning direction SD, and scanning in the main scan direction is again performed for the next row. These scans are repeated to scan the two-dimensional image 5.

The main scanning direction MD is a direction along which scanning is performed in a shorter period, and the sub-scanning direction SD is a direction along which scanning is performed in a longer period.

The amplifier 4 outputs analog electric signals to the A/D converter 11. The A/D converter 11 converts the analog electric signals into digital electric signals and outputs the digital electric signals to a signal processing unit 12. The digital electric image signals are subjected to a white balance process and the like at the signal processing unit 12 and stored in a frame memory 13. The digital image signals in the frame memory 13 are converted into analog image signals by a D/A converter 16 and supplied to a monitor 14.

The image signals read from the frame memory 13 are displayed as an image 15 on the monitor 14 through raster scanning of the monitor 14. With this raster scanning, scanning in the image horizontal direction is first performed as the main scanning direction MD, and then scanning in the image vertical direction is performed as the sub-scanning direction SD. Thereafter, scanning in the main scanning direction (image horizontal direction) MD is again performed for the next line (in horizontal direction in FIG. 1). These scans are repeated to display the two-dimensional image 15 on the monitor 14.

The main scanning direction MD and sub-scanning direction SD on the solid-state image pickup device 1 are different from the main scanning direction MD and sub-scanning direction SD on the monitor 14. The main scanning direction MD on the solid-state image pickup device 1 corresponds to the sub-scanning direction SD on the monitor, and the sub-scanning direction on the solid-state image pickup device 1 corresponds to the main scanning direction on the monitor 14.

Therefore, it is necessary to display the image signals read from the solid-state image pickup device 1 on the monitor 14 by interchanging the main scan direction MD and sub-scanning direction SD. Specifically, pixel position conversion is performed so as to interchange the main scanning direction MD and sub-scanning direction SD and display the image in a normal direction on the monitor 14. This pixel position conversion corresponds to a process of rotating the image by 90°. The details of this process will be later described.

Figure 2A:
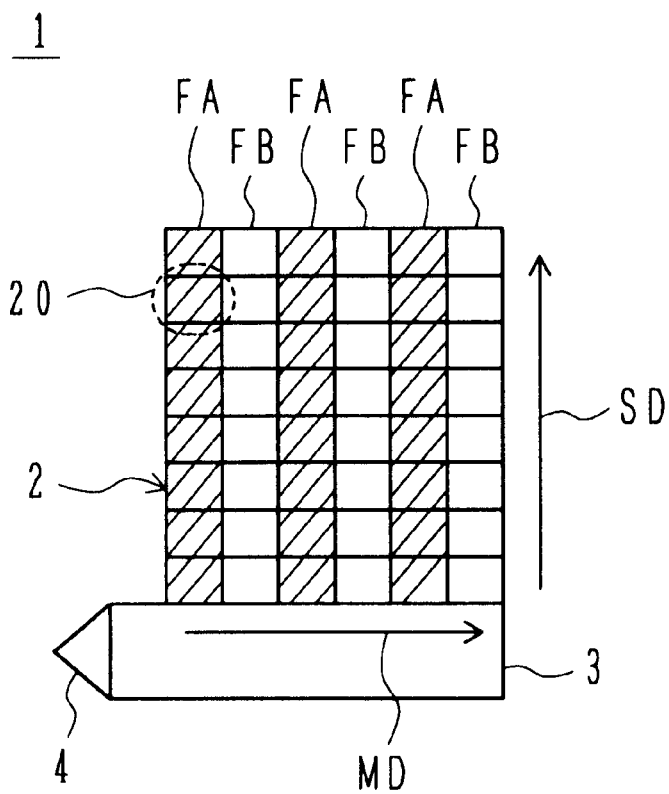
FIG. 2A, is a schematic diagram illustrating interlace-scanning of a solid-state image pickup device shown in FIG. 1.
Figure 2B:
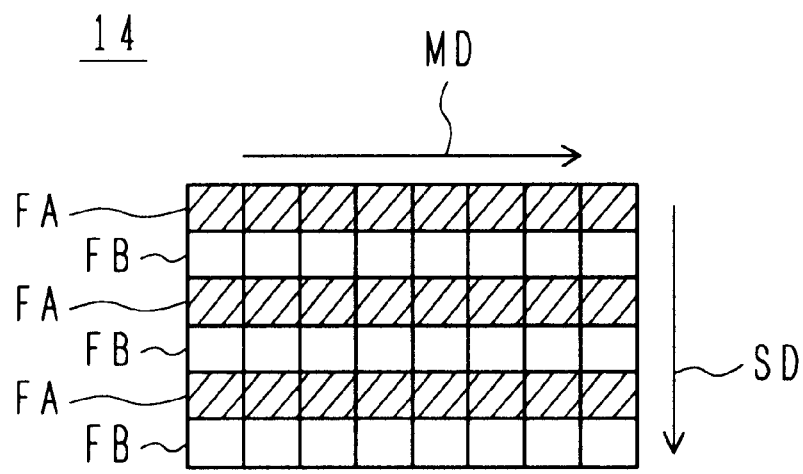
FIG. 2B is a schematic diagram illustrating interlace-scanning of a monitor shown in FIG. 1.

FIGS. 2A and 2B are schematic diagrams illustrating an image signal processing of interlace-scanning according to the embodiment of the invention. The interlace-scanning forms one frame by two fields, an A field FA and a B field FB. In FIGS. 2A and 2B, the A field FA is shown as a hatched area.

FIG. 2A is a schematic diagram illustrating the interlace-scanning of the solid-state image pickup device 1. The solid-state image pickup device 1 in FIG. 2A is shown by rotating the device 1 shown in FIG. 1 by 90°. For the solid-state image pickup device 1, a charge transfer for the A field constituted of odd columns (trains of pixels in the vertical direction) is first executed, and then a charge transfer for the B field constituted of even columns is executed. One column is a train of pixels to be scanned in the sub-scanning direction (image horizontal direction). A position along the main scanning direction (image vertical direction) MD determines whether the scanning is for the A field FA or B field FB.

FIG. 2B is a schematic diagram illustrating interlace-scanning of the monitor 14. For the monitor 14, scanning for the A field constituted of odd rows (along an image horizontal direction) is first executed, and then scanning for the B field constituted of even rows is executed. As different from the solid-state image pickup device 1, one row is a train of pixels to be scanned in the main scanning direction (image horizontal direction) MD. A position along the sub-scanning direction (image vertical direction) SD determines whether the scanning is for the A field FA or B field FB.

In FIG. 2A, the pixel field 2 has a plurality of unit pixels 20 disposed two-dimensionally. A unit pixel 20 corresponds to one pixel.

Figure 3:
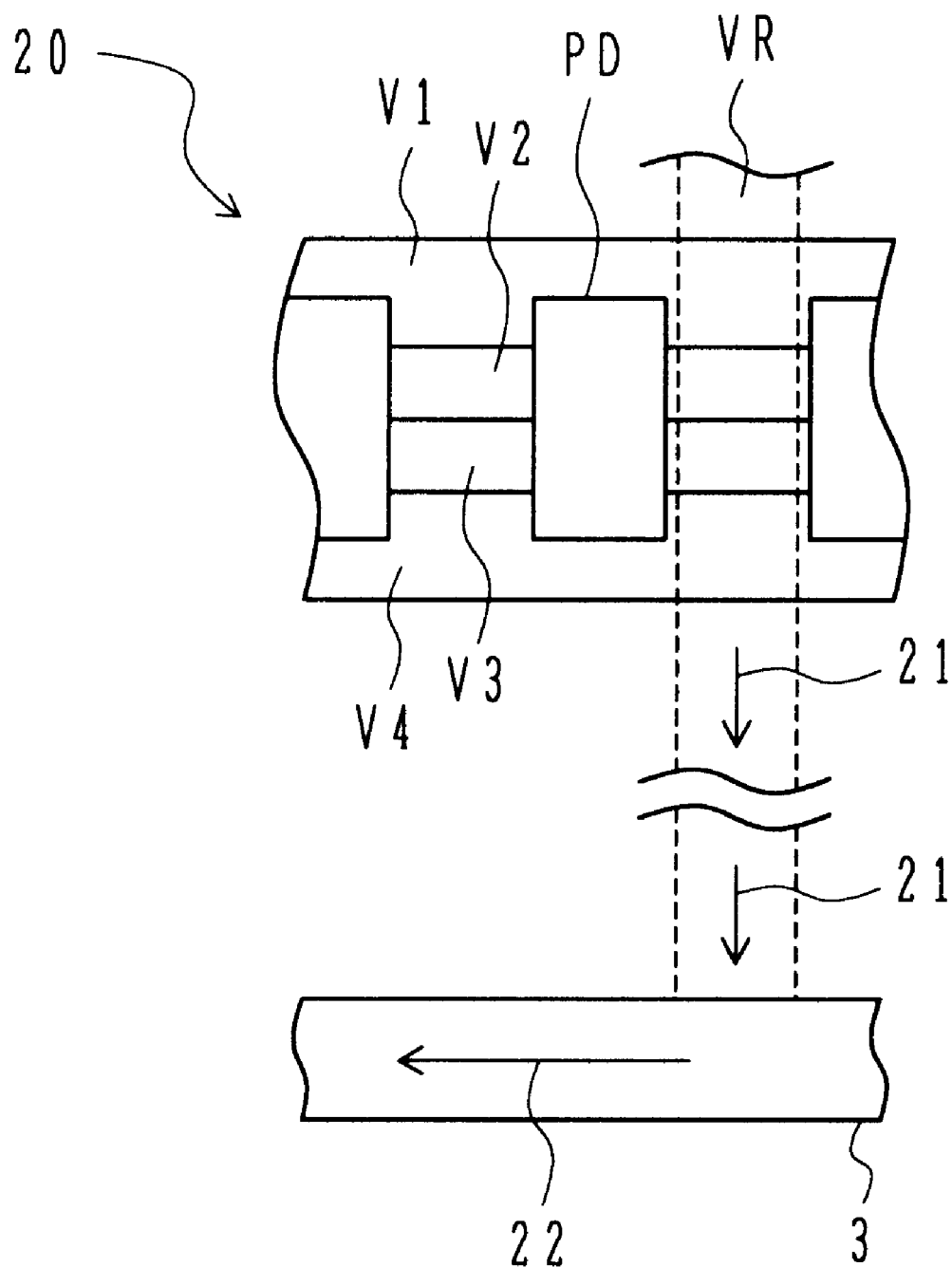
FIG. 3 is a plan view showing the structure of a unit pixel field of a solid-state image pickup device.

FIG. 3 is a plan view showing the structure of the unit pixel 20 shown in FIG. 2A.

The unit pixel 20 has a photodiode PD and a vertical transfer path VR. The photodiode PD converts received light into electric charges which are transferred via a gate to the vertical transfer path VR. The vertical transfer path VR is four-phase driven via four electrodes V1, V2, V3, and V4 and transfers electric charges in a vertical direction 21. The electric charges on the vertical transfer path VR are transferred to the horizontal transfer path 3 which transfers the electric charges in a horizontal direction 22. For the general background of a solid-state image pickup device, for example, refer to U.S. Pat. No. 5,528,291 and U.S. Pat. No. 5,608,455 which are herein incorporated by reference.

Figure 4:
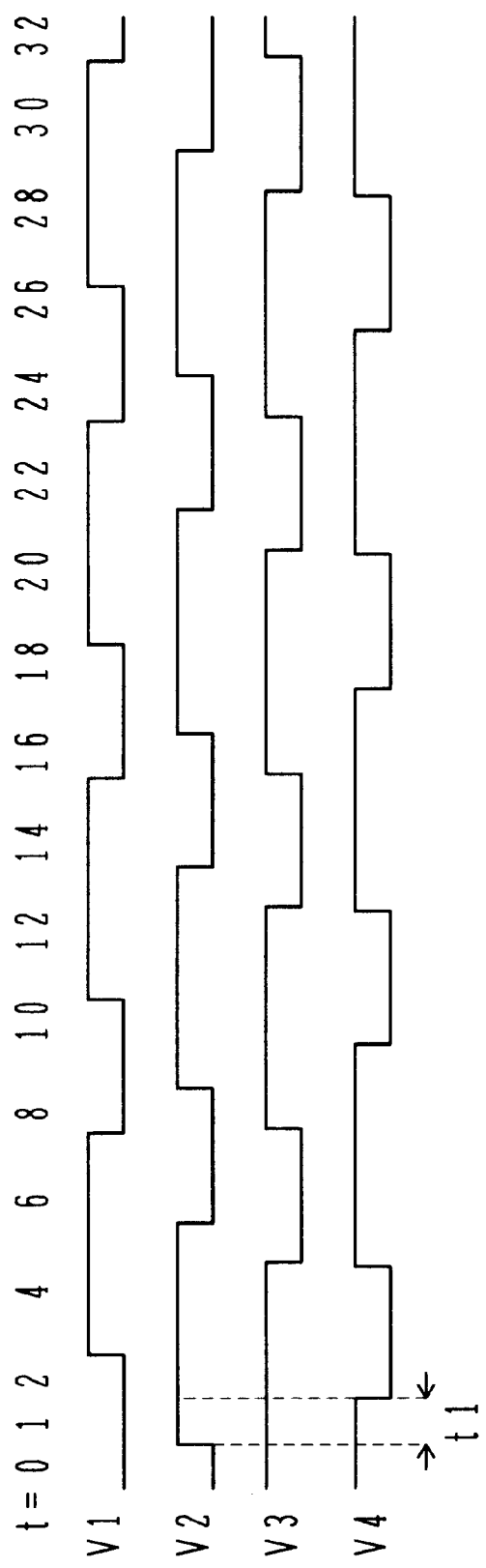
FIG. 4 is a timing chart of pulse signals applied to electrodes V1 to V4.

FIG. 4 is a timing chart of pulse signals applied to the electrodes V1 to V4. A time duration t1 while one pulse signal is superposed upon another pulse signal is used as a unit time of a time t along the abscissa.

Figure 5:
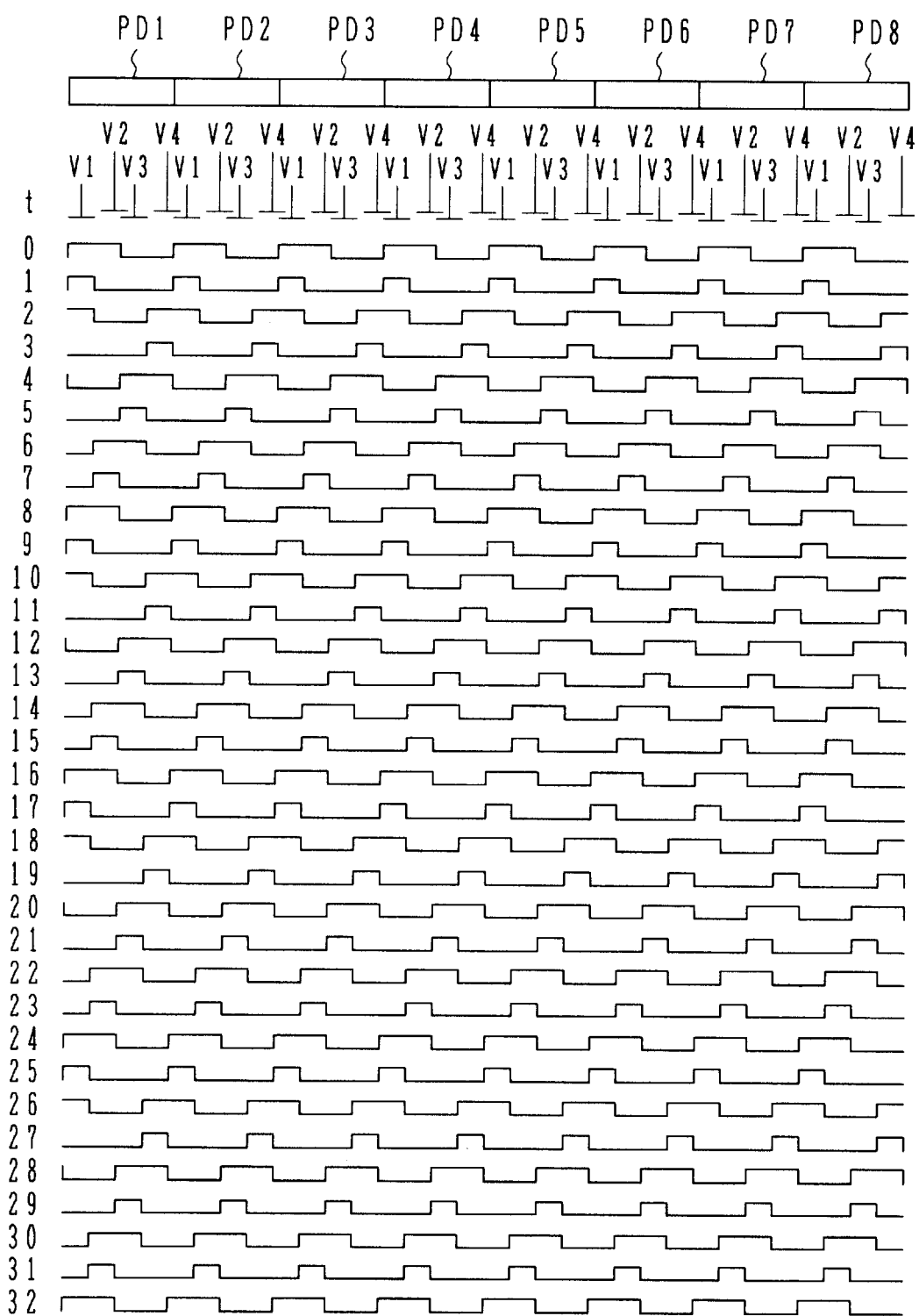
FIG. 5 is a diagram showing potential transition in a vertical transfer path.

FIG. 5 is a diagram showing potential transition on the vertical transfer path, the ordinate thereof being represented by the time t shown in FIG. 4 and the abscissa being represented by a vertical position along the vertical transfer path. For example, eight photodiodes PD1 to PD8 are disposed in the vertical direction (horizontal direction in FIG. 5) and connected to one vertical transfer path. Along the vertical transfer path, four electrodes V1 to V4 per one photodiode PD are provided. By supplying the electrodes V1 to V4 with the pulse signals shown in FIG. 4, the potential transition shown in FIG. 5 is generated. Electric charges are accumulated in a low potential area. As shown in FIG. 5, as the potential changes, electric charges are transferred along the vertical transfer path from the right to left in FIG. 5.

Next, the reason why the solid-state image pickup device 1 (FIG. 1) of the embodiment can transfer electric charges at higher speed than the conventional solid-state image pickup device 51 (FIG. 18) will be described.

Figure 6A:
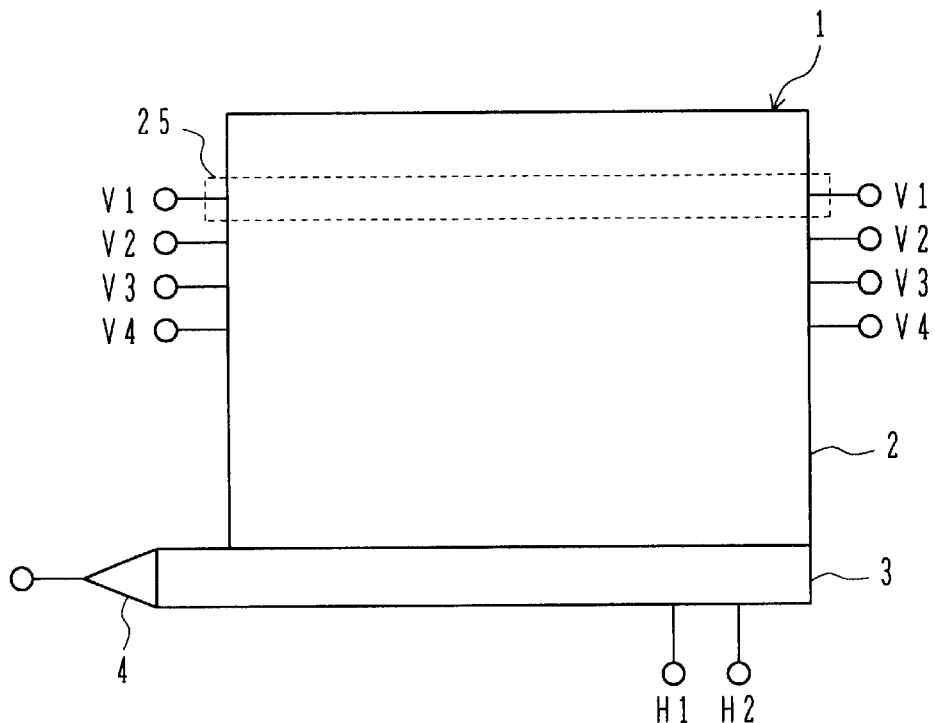
FIG. 6A is a plan view showing the structure of a solid-state image pickup device with connected electrodes.

FIG. 6A shows the structure of the solid-state image pickup device 1 connected with the electrodes V1 to V4, H1, and H2. The electrodes V1 to V4 are used for driving the vertical transfer path and connected to opposite ends of the pixel field 2 in the horizontal direction. The electrodes H1 and H2 are used for driving the horizontal transfer path 3 and connected to the horizontal transfer path 3.

Figure 6B:
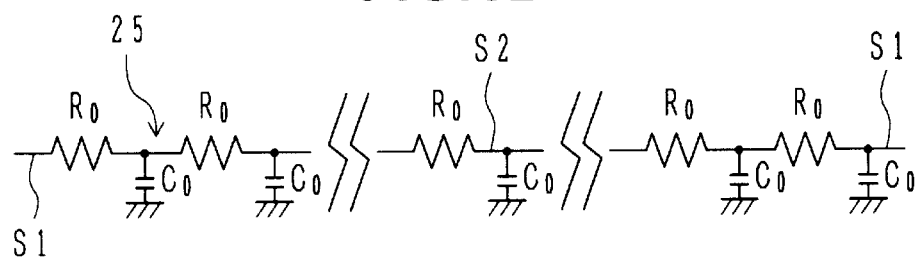
FIG. 6B is an equivalent circuit of an electrode wiring.

FIG. 6B is an electrical equivalent circuit of an electrode wiring portion from the left electrode terminal V1 to right electrode terminal V1 shown in FIG. 6A. A resistance R0 is a resistance of one pixel and a capacitance C0 is a capacitance of one pixel. The electrode wiring portion 25 has Nh serially connected resistors and Nh parallelly connected capacitors where Nh is the number of pixels in the horizontal direction.

The total capacitance Ct and total resistance Rt of the wiring portion 25 are given by the following equations (1) and (2):

$$Ct = Nh \times C0 \qquad \ldots (1)$$

$$Rt = Nh \times R0 \qquad \ldots (2)$$

A CR time constant T of the wiring portion 25 is given by the following equation (3):

$$\tau = Ct \times Rt \qquad (3)$$
$$= Nh^2 \times C0 \times R0$$

The time constant τ of the wiring portion 25 is proportional to a square of the number Nh of horizontal pixels. The smaller the number Nh of horizontal pixels, the CR time constant becomes smaller and the vertical transfer path can be driven at higher speed.

Figure 6C:
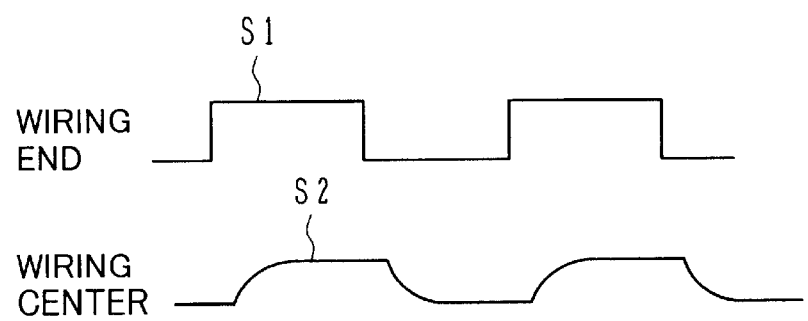
FIG. 6C shows waveforms of an electrode clock signal.

FIG. 6C shows waveforms of the clock signal propagating through the wiring portion. The clock waveform S1 is a waveform of a clock signal at the ends of the wiring portion 25 shown in FIG. 6B, and the clock waveform S2 is a waveforms of a clock signal at the center of the wiring portion 25 shown in FIG. 6B. As the clock period is made shorter with respect to the CR time constant, the waveform S2 at the center shown in FIG. 6C becomes gentle so that the amount of transferable charges reduces and the transfer efficiency is lowered.

The CR time constant of the conventional solid-state image pickup device 51 (shown in FIG. 18) and that of the solid-state image pickup device 1 (shown in FIG. 1) of the embodiment are compared with each other. The CR time constant is calculated by taking as an example a solid-state image pickup device having the pixel field of 1536×1024 pixels (aspect ratio is 3:2).

The solid-state image pickup devices 1 and 51 have the numbers of horizontal and vertical pixels interchanged each other. The numbers of horizontal and vertical pixels of the solid-state image pickup device 51 are 1536 and 1024, whereas the numbers of horizontal and vertical pixels of the solid-state image pickup device 1 are 1024 and 1536.

The time constant of the conventional solid-state image pickup device 51 is first calculated. The number Nh of horizontal pixels of the solid-state image pickup device 51 is 1536. The CR time constant τ1 is therefore given as in the following by using the equation (3):

$$\tau 1 = Nh^2 \times C0 \times R0$$
$$= 1536^2 \times C0 \times R0.$$

Next, the time constant of the embodiment solid-state image pickup device 1 is calculated. The number Nh of horizontal pixels of the solid-state image pickup device 1 is 1024. The CR time constant τ2 is therefore given as in the following by using the equation (3):

$$\tau 2 = Nh^2 \times C0 \times R0$$
$$= 1024^2 \times C0 \times R0.$$

A ratio τ2/τ1 between the two time constants is given by:

$$\tau 2 / \tau 1 = 1024^2 / 1536^2$$
$$= 1 / 2.25$$

The time constant τ2 of the solid-state image pickup device 1 is 1/2.25 of the time constant τ1 of the solid-state image pickup device 51. The vertical transfer speed of the solid-state image pickup device 1 is therefore faster than that of the solid-state image pickup device 51 by 2.25 times.

Although both the solid-state image pickup devices 1 and 51 can take an image of the same size (e.g., 1536×1024 pixels), the solid-state image pickup device 1 can vertically transfer charges at higher speed than the solid-state image pickup device 51.

The solid-state image pickup device 1 of the embodiment can be configured to have a smaller number of horizontal pixels Nh than the number of vertical pixels Nv, as described above. By setting the smaller number of pixels among the numbers of two-dimensional pixels (vertical and horizontal pixels) to the number Nh of horizontal pixels, a high speed charge transfer becomes possible. It is preferable to set Nh/Nv smaller than 1, and more preferable to set it equal to or smaller than ⅔.

The solid-state image pickup device 1 has two read modes. The first mode is a full pixel read mode in which all of the pixels 1536×1024 are read. This first mode is used, for example, when a high precision image is printed with a printer.

The second mode is a thinning read mode in which an image of 1536×1024 pixels is thinned and an image of 384×512 pixels is read. Three pixels among four pixels are thinned from the 1536 pixels in the horizontal direction and three pixels among four pixels are thinned from the 1024 pixels in the vertical direction, to thereby obtain an image of 256 pixels per one field (512 pixels per one frame). The second mode is used, for example, when an image is displayed on a small liquid crystal display mounted on a camera in order to adjust an angle of view, or when an image is picked up in order to perform auto focus.

The description will be given by taking as an example the second mode among the first and second modes.

Figure 8:
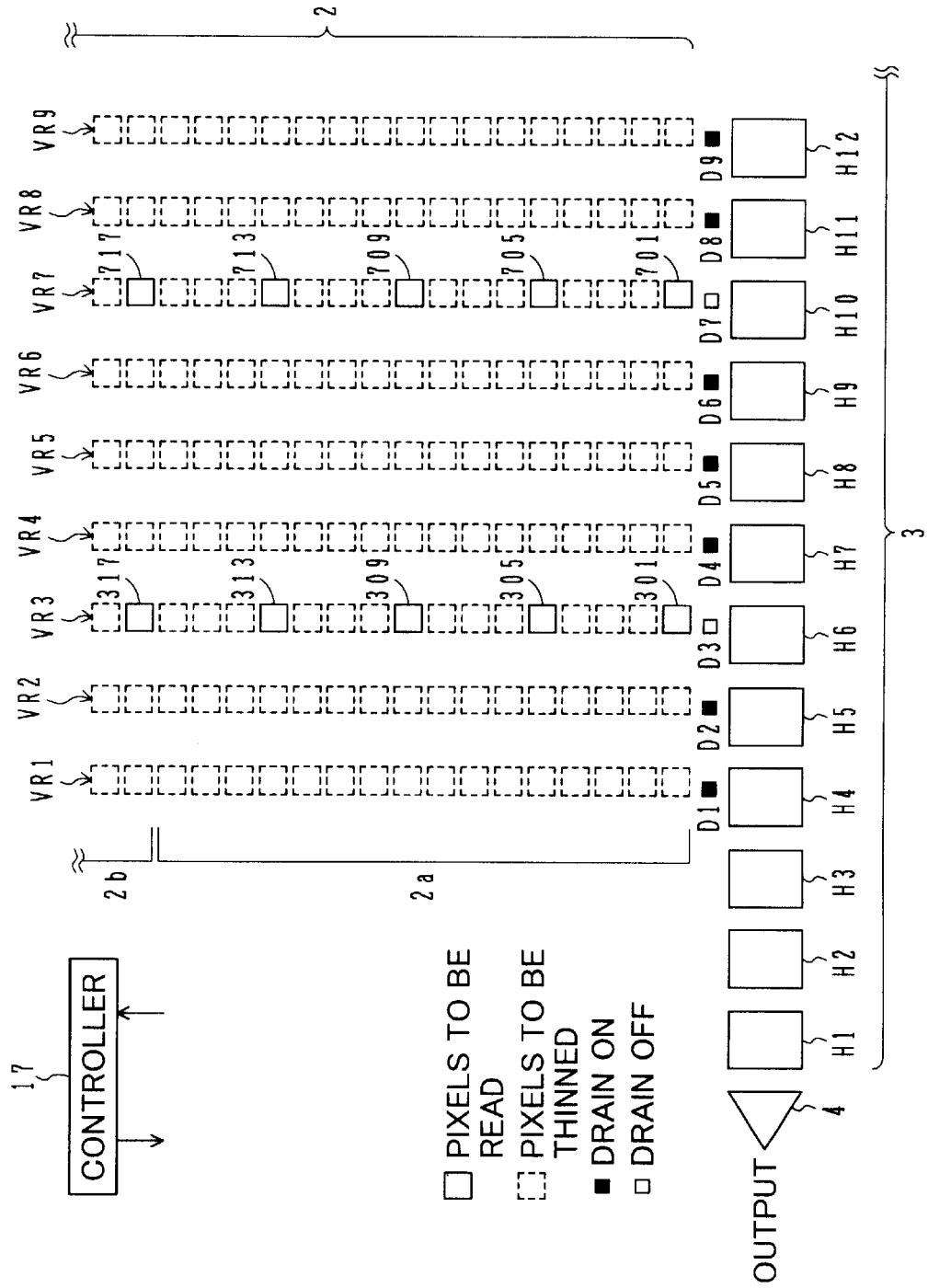
FIG. 8 is a plan view illustrating and operation of the solid-state image pickup device when image signals of a B field are read.

FIG. 7 illustrates an operation of reading image signals of the A field from a solid-state image pickup device, and FIG. 8 illustrates an operation of reading image signals of the B field from the solid-state image pickup device. FIGS. 7 and 8 are partial views of the solid-state image pickup device.

Vertical charge transfer paths VR1 to VR9 transfer charges in the vertical direction. A horizontal charge transfer path 3 has a plurality of transfer stages H1 to H12 and transfers charges in the horizontal direction. An amplifier 4 amplifies charges transferred from the horizontal transfer path 3 and outputs them.

Charges on the vertical transfer paths VR1 to VR9 are transferred via drains D1 to D9 to the horizontal transfer stages H4 to H12. The horizontal transfer stages H1 to H3 have no corresponding vertical transfer paths.

In the following description, an optional one or all of the drains D1 to D9, horizontal transfer stages H1 to H12, and vertical transfer paths VR1 to VR9 are simply called a drain D, horizontal transfer stage H, or vertical transfer path VR. The drain D is provided between the vertical transfer path VR and horizontal transfer stage H. When the drain D is turned on, charges transferred from the vertical transfer path VR are drained to the drain D and are not transferred to the horizontal stage H. When the drain D is turned off, the charges transferred from the vertical transfer path VR pass by the drain D and reach the horizontal transfer stage H. By draining charges from the turned on drain D, charges can be thinned. For example, if the drain D1 is turned off and the drains D2 to D4 are turned on, three pixels among four pixels in the horizontal direction can be thinned.

A controller 17 is for example a microprocessor and controls the charge transfer by the vertical transfer path VR and horizontal transfer path 3 and the turn-on/off of the drain D. For the control of the charge transfer, the controller 17 supplies the vertical transfer electrodes V1 to V4 and horizontal transfer electrodes H1 and H2 with charge transfer pulses.

First, with reference to FIG. 7, a read operation of the A field FA will be described. The pixel field 2 has a plurality of photodiodes disposed two-dimensionally. Each photodiode stores electric charges corresponding in amount to the intensity of received light. The charges stored in photodiodes are transferred in the corresponding vertical transfer paths VR1, VR5, and VR9. The charges stored in the other photodiodes are transferred in the corresponding vertical transfer paths VR2 to VR4, and VR6 to VR8. FIG. 7 illustrates this charge transfer state.

Figures 9A, 9B, 9C:
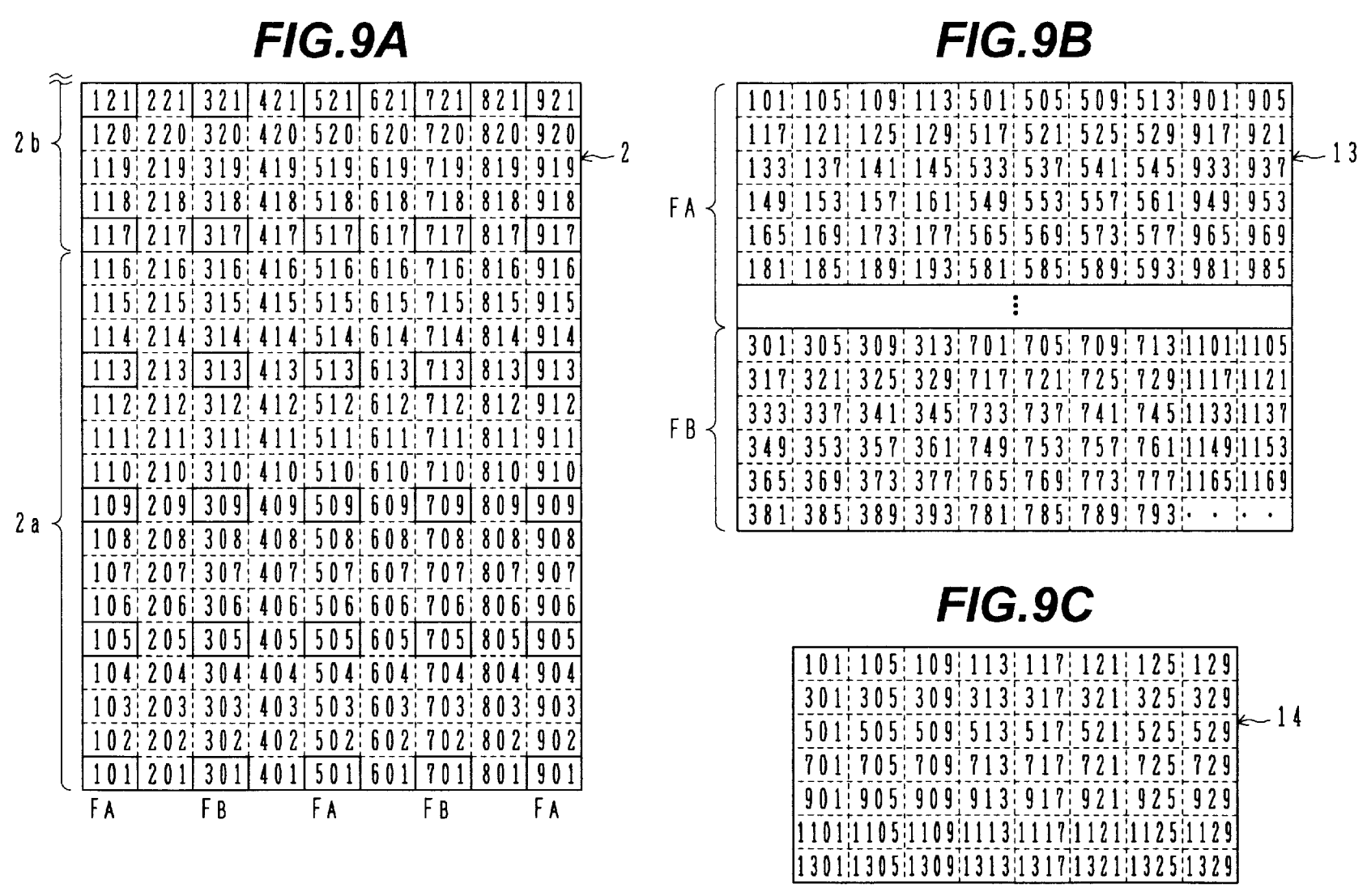

Each vertical transfer path VR has a plurality of vertical transfer stages disposed along the vertical direction. In the pixel field 2, electric charges are transferred in the vertical transfer stages disposed two-dimensionally. FIG. 9A shows the array of such electric charges. Electric charges surrounded by solid lines, such as charges 101 and 105 are electric charges to be read, and electric charges surrounded by broken lines such as charges 102 and 103 are electric charges to be thinned.

By turning off the drains D1, D5 and D9 and turning on the drains D2 to D4, and D6 to D8, only the electric charges in the vertical transfer paths VR1, VR5, and VR9 can be transferred to the horizontal transfer path 3. Namely, one pixel among four pixels in the horizontal direction can be read and three pixels among four pixels can be thinned.

Also in the vertical direction, one pixel among four pixels is read and the other three pixels are thinned. Charges in a charge area 2a are transferred at the same time in the first transfer operation of the horizontal transfer path 3, and charges in a charge area 2b are transferred at the same time in the second transfer operation of the horizontal transfer path 3. This transfer method will be later described with reference to FIGS. 10 to 13.

Next, with reference to FIG. 8, a read operation of the B field FB will be described. After the read operation of the A field FA is completed, the read operation of the B field FB is executed. The charges stored in photodiodes are transferred in the corresponding vertical transfer paths VR3 and VR7. The charges stored in the other photodiodes are transferred in the corresponding vertical transfer paths VR1, VR2, VR4 to VR6, VR8, and VR9. FIG. 8 illustrates this charge transfer state.

In the pixel field 2, electric charges are transferred in the vertical transfer stages disposed two-dimensionally. FIG. 9A shows the array of such electric charges. Electric charges surrounded by solid lines such as charges 301 and 305 are electric charges to be read, and electric charges surrounded by broken lines such as charges 302 and 303 are electric charges to be thinned.

By turning off the drains D3 and D7 and turning on the drains D1, D2, D4 to D6, D8, and D9, only the electric charges in the vertical transfer paths VR3 and VR7 can be transferred to the horizontal transfer path 3. Namely, one pixel among four pixels in the horizontal direction can be read and three pixels among four pixels can be thinned.

Also in the vertical direction, one pixel among four pixels is read and the other three pixels are thinned. Charges in the charge area 2a are transferred at the same time in the first transfer operation of the horizontal transfer path 3, and charges in the charge area 2b are transferred at the same time in the second transfer operation of the horizontal transfer path 3.

Next, with reference to FIGS. 10 to 13, the read operation of the A field FA will be described. First, as described with FIG. 7, charges are read from photodiodes to the vertical transfer path VR. Thereafter, charges in the vertical transfer path VR is transferred by one stage in the vertical direction (to the lower in FIG. 10).

Figure 10:
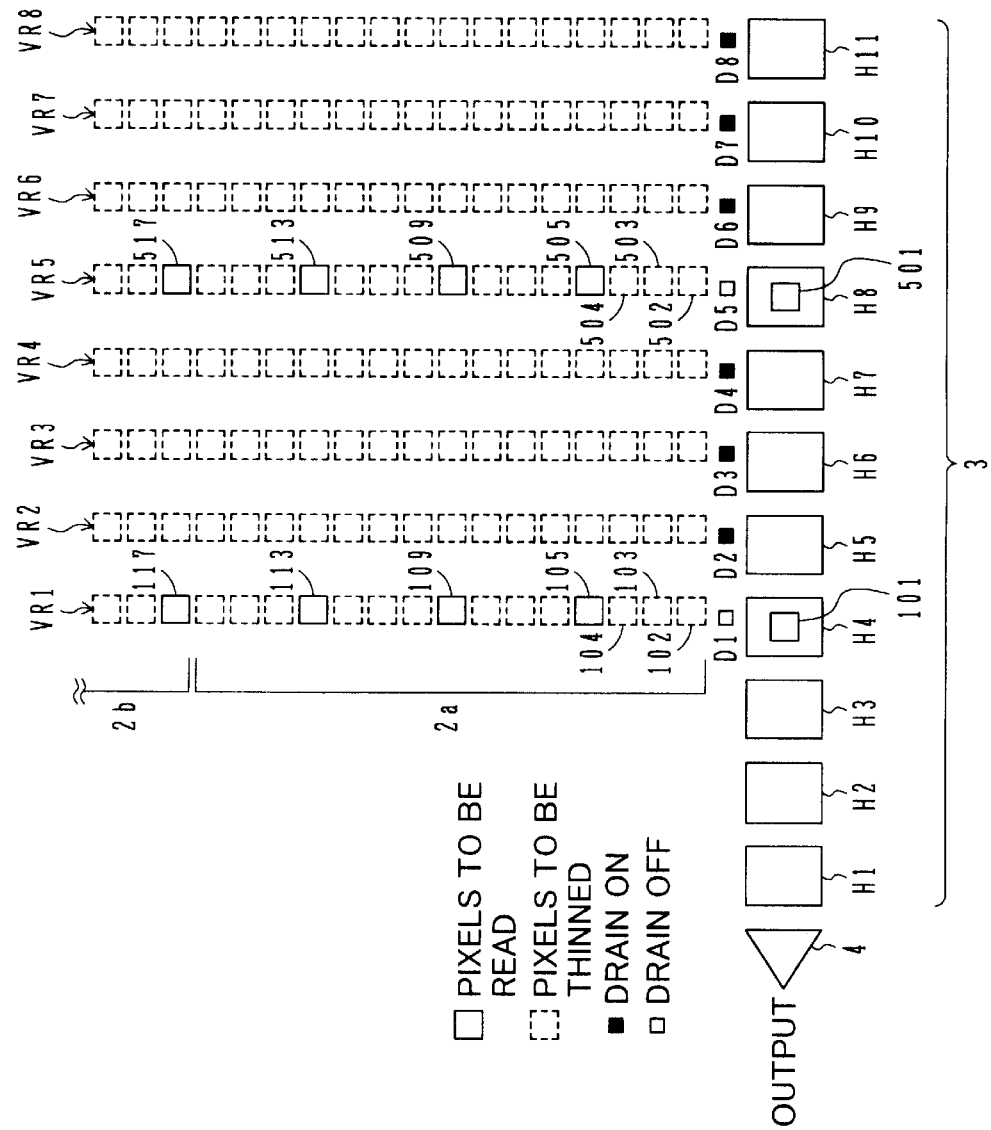
FIGS. 10 to 13 are plan views illustrating the operations of the solid-state image pickup device when image signals are read after the operation illustrated in FIG. 7.

As shown in FIG. 10, electric charges 101 are transferred from the vertical transfer path VR1 to the horizontal transfer stage H4 via the turned-off drain D1. Electric charges 501 are transferred from the vertical transfer path VR5 to the horizontal transfer stage H8 via the turned-off drain D5. Since the drains D2 to D4, and D6 to D8 are turned on, electric charges are not flowed into the horizontal transfer stages H5 to H7, and H9 to H11.

Next, all the drains D1 to D8 are turned on to transfer electric charges on the vertical transfer path VR by three stages in the vertical direction to drain the electric charges of the three stages from the drains D1 to D8. Electric charges 102 to 104 and 502 to 504 are drained from the drains D1 and D5.

Next, the electric charges on the horizontal transfer path 3 are transferred by one stage in the horizontal direction (to the left). This horizontal transfer may be executed as the same time when the above-described vertical transfer is executed. Thereafter, similar to the above, the drains D1 and D5 are turned off, and electric charges on the vertical transfer path VR are transferred by one stage in the vertical direction (to the lower).

Figure 11:
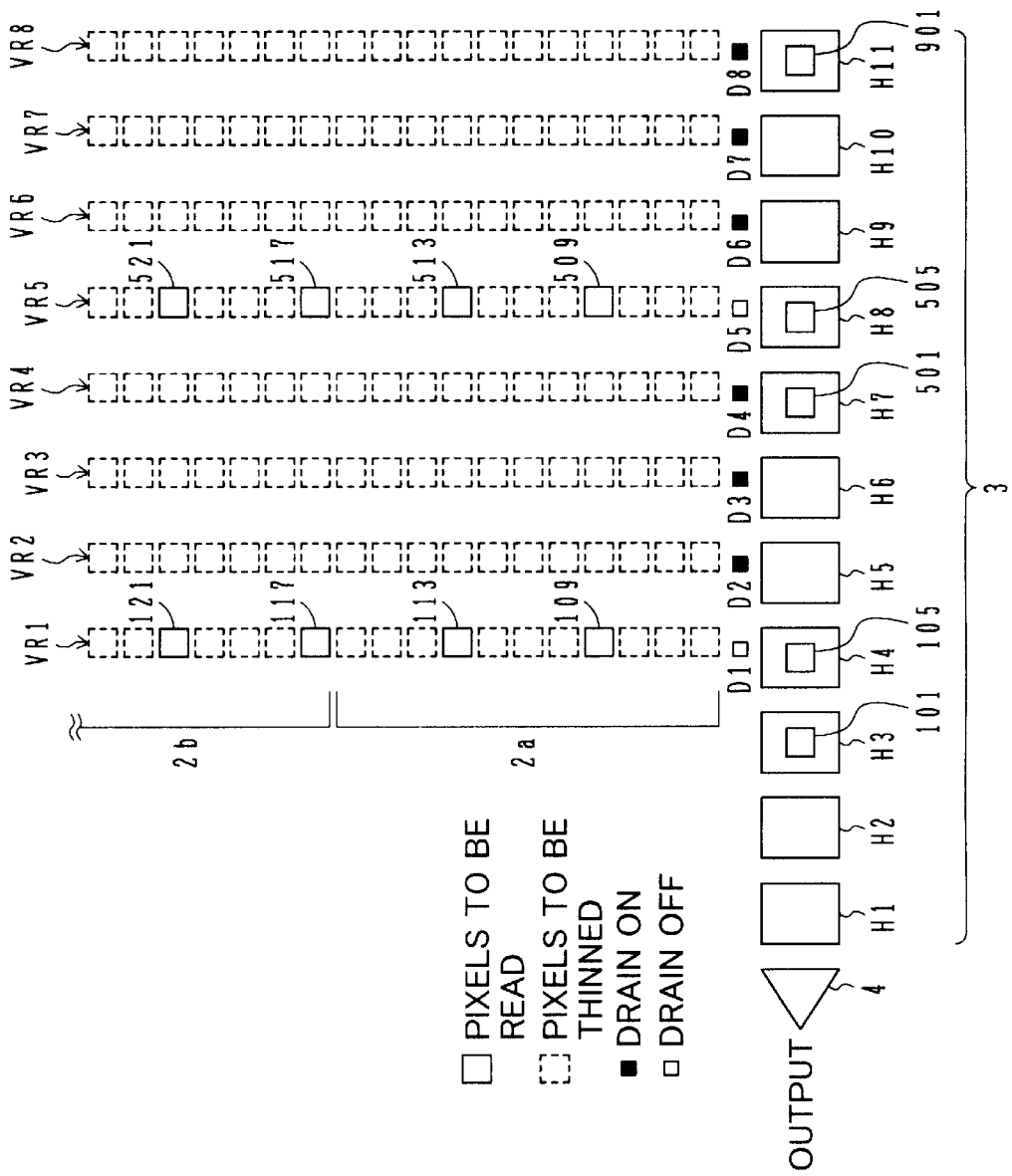

Therefore, as shown in FIG. 11, the electric charges 101 are stored in the horizontal transfer stage H3, and the electric charges 105 are stored in the horizontal transfer stage H4. The electric charges 501 and 505 are stored in the horizontal transfer stages H7 and H8. Electric charges 901 are stored in the horizontal transfer stage H11.

Next, similar to the above, all the drains D1 to D8 are turned on to transfer electric charges on the vertical transfer path VR by three stages in the vertical direction to drain the electric charges of the three stages from the drains D1 to D8. Next, the electric charges on the horizontal transfer path 3 are transferred by one stage in the horizontal direction, and thereafter the drains D1 and D5 are turned off to transfer electric charges on the vertical transfer path VR by one stage in the vertical direction.

Figure 12:
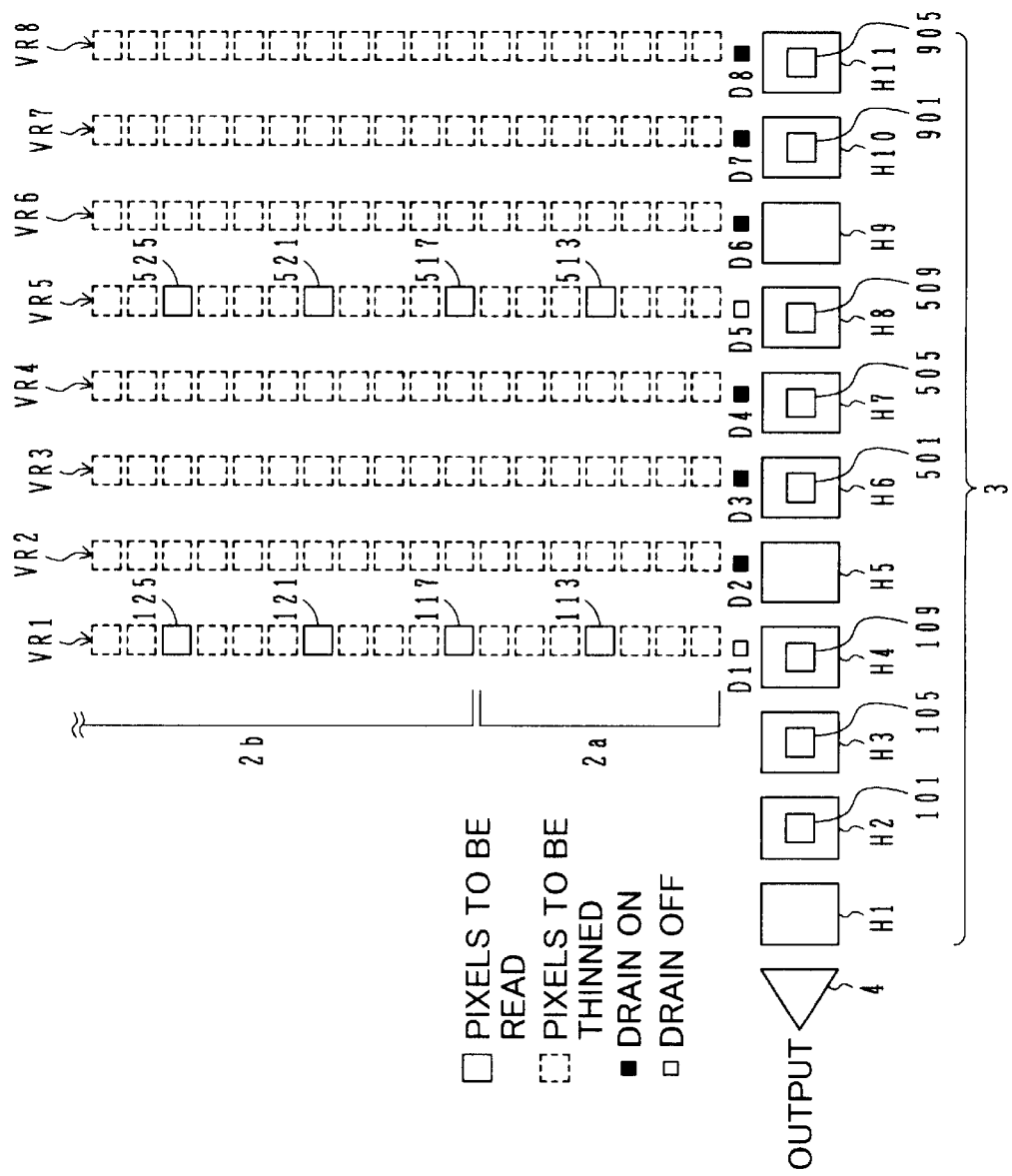

As shown in FIG. 12, therefore, the electric charges 101, 105, and 109 are stored in the horizontal transfer stages H2, H3, and H4, the electric charges 501, 505, and 509 are stored in the horizontal transfer stages H6, H7, and H8, and the electric charges 901 and 905 are stored in the horizontal transfer stages H10 and H11.

Next, all the drains D1 to D8 are again turned on to transfer electric charges on the vertical transfer path VR by three stages in the vertical direction to drain the electric charges of the three stages from the drains D1 to D8. Next, the electric charges on the horizontal transfer path 3 are transferred by one stage in the horizontal direction, and thereafter the drains D1 and D5 are turned off to transfer electric charges on the vertical transfer path VR by one stage in the vertical direction.

Figure 13:
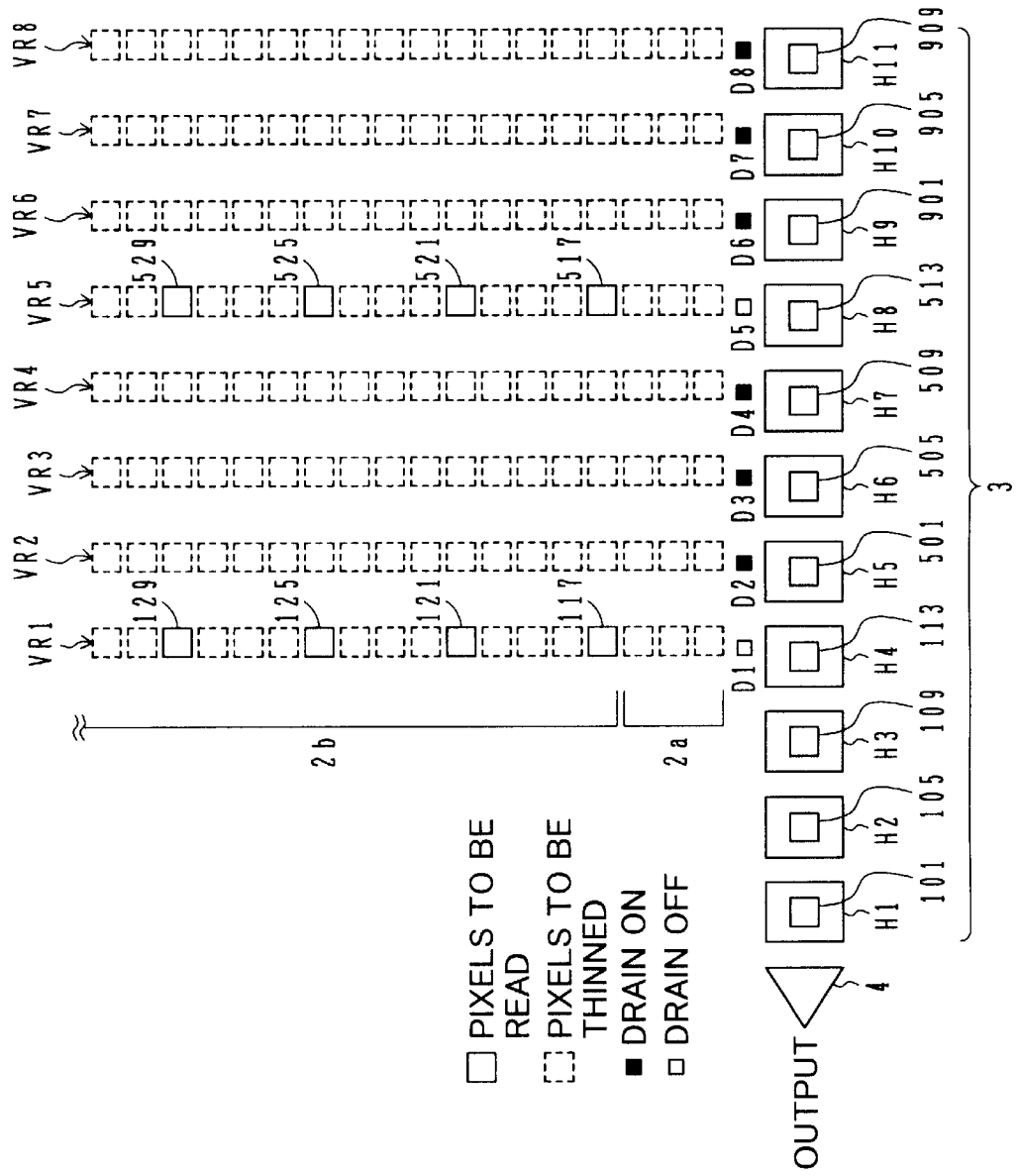
Figure 14:
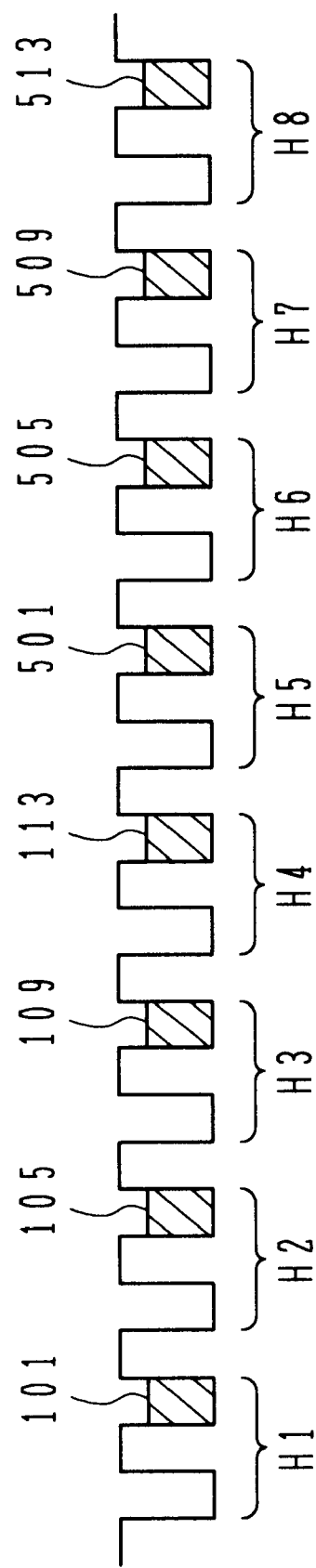
FIG. 14 is a potential diagram illustrating an electric charge accumulation state in a horizontal transfer path shown in FIG. 13.

As shown in FIG. 13, therefore, the electric charges 101, 105, 109, 113, 501, 505, 509, 513, 901, 905, and 909 are stored in the horizontal transfer stages H1 to H11. All the horizontal transfer stages are filled with pixel charges at this time. This state is illustrated in FIG. 14. Electric charges 101, 105, . . . are shown hatched. One horizontal transfer stage H has two packets in which electric charges can be stored. While one packet is filled with electric charges, the other packet is always empty. At least two packets are necessary for enabling the horizontal transfer of electric charges.

Next, the horizontal transfer path 3 is driven to sequentially output all the electric charges on the horizontal transfer path 3 to the amplifier 4 and written in the frame memory 13 (FIG. 1). Since the electric charges on the horizontal transfer path 3 are output after all the horizontal transfer stages H are filled with the electric charges, an efficient horizontal transfer is possible.

FIG. 9B shows an array of pixel values stored in the frame memory 13. As shown in the first row of FIG. 9B, the array of pixel values corresponding to the electric charges in the order described above is written in the frame memory 13. This array of pixel values corresponds to the charge area 2$a$ shown in FIGS. 7 and 9A.

By repeating the procedure similar to the above, pixel values corresponding to the electric charges in the charge area 2$b$ shown in FIGS. 13 and 9A are written in the frame memory 13. As shown in the second row of FIG. 9B, pixel values corresponding to the electric charges 117, 121, 125, . . . in the charge area 2$b$ are written in the frame memory 13.

All the pixel values corresponding to electric charges on the vertical transfer path VR in the A field FA are written in the frame memory 13 by the procedure similar to the above.

After the pixel values in the A field FA is written in the frame memory 13, pixel values in the B field FB are written in the frame memory 13 by the procedure similar to the above. The pixel values (FIGS. 8 and 9A) in the charge areas 2$a$ and 2$b$ are written in the first and second rows in the B field FB of the frame memory 13 (FIG. 9B).

The pixel values in the frame memory 13 shown in FIG. 9B are read through pixel array conversion and supplied to the monitor 14. An image having a pixel array shown in FIG. 9C is displayed on the monitor 14. This pixel array conversion is a reverse operation of reading electric charges from the solid-state image pickup device 1. With this pixel array conversion, an image having a normal pixel array can be displayed on the monitor 14.

The pixel field 2 of the solid-state image pickup device 1 shown in FIG. 9A is set in actual being rotated by 90° in the clockwise direction as shown in FIG. 1. Therefore, the direction of an image on the solid-state image pickup device 1 is the same as that on the monitor 14. Therefore, an image on the solid-state image pickup device 1 can be thinned and displayed on the monitor 13.

As shown in FIG. 13, since the electric charges on the horizontal transfer path 3 are transferred and output after all the horizontal transfer stages H are filled with the electric charges, an efficient horizontal transfer is possible. If all electric charges on the horizontal transfer path 3 are output each time when the electric charges are transferred by one stage in the vertical direction as shown in FIG. 10 (before all the horizontal transfer stages H are not filled with electric charges), it is necessary to repeat an operation of outputting electric charges on the horizontal transfer path 3 as many times as the number of pixels in the vertical direction. In this embodiment, since four pixels in the vertical direction can be transferred to the horizontal transfer path 3 at the same time, a speed of reading one field can be increased by about four times.

In this embodiment, four pixels in the vertical direction are transferred in the horizontal direction at the same time. However, if the number of pixels is four or smaller, these pixels can be transferred at the same time. The highest efficiency can be achieved when four pixels are transferred at the same time. If one pixel is read from n pixels in the horizontal direction, n pixels in the vertical direction can be transferred in the horizontal direction at the same time.

Interlace-scanning has been described above. Even with non-interlace scanning, an image of one frame can be read from a solid-state image pickup device by method similar to the above.

Next, a time required for reading image signals of one field from the embodiment solid-state image pickup device 1 is calculated.

The solid-state image pickup device 1 has 1024 pixels in the horizontal direction and 1536 pixels in the vertical direction. In other words, an image picked up on the solid-state image pickup device 1 has 1536 pixels in the horizontal direction (as in FIG. 1) and 1024 pixels in the vertical direction (as in FIG. 1). The monitor 14 has 384 pixels in the horizontal direction and 512 pixels in the vertical direction.

A thinning ratio of reading pixels from the solid-state image pickup device 1 in the vertical direction is given by:

1536 pixels/384 pixels=4

Therefore, one pixel is read from four pixels on the vertical transfer path.

A thinning ratio of reading pixels from the solid-state image pickup device 1 in the horizontal direction is given by:

1024 pixels/512 pixels=2

This thinning ratio is for one frame. A thinning ratio for one field is 2×2=4. Namely, one pixel is read from four pixels (on four vertical transfer paths).

If the charge transfer frequency is 14 MHz, a transfer pulse period 1 fH is given by:

1$fH$=1/14 MHz≈70 ns

The superposing time t1 (FIG. 4) of the transfer pulse is assumed to the 10 fH.

A transfer time T1 per one stage of a vertical transfer path is t1×8 as shown in FIG. 5. For example, the transfer time T1 is a time from t=0 to t=8. In order to transfer 16 stages (four pixels) on the vertical transfer path, 16 cycles are necessary. This transfer time T2 is T1×16 cycles.

A transfer time T3 required for transferring all pixels on the horizontal transfer path is 1024 pixels×70 ns.

One horizontal period 1H is T2+T3=161.3 $\mu$s.

In the vertical direction, 384 pixels are transferred in the unit of four pixels, a time taken to read one field is 161.3 $\mu$s×384/4=15 ms.

Since the one field read time of 15 ms is shorter than 1/60 sec (about 16.7 ms), an image of an NTSC format can be displayed on the monitor.

Figure 20A:
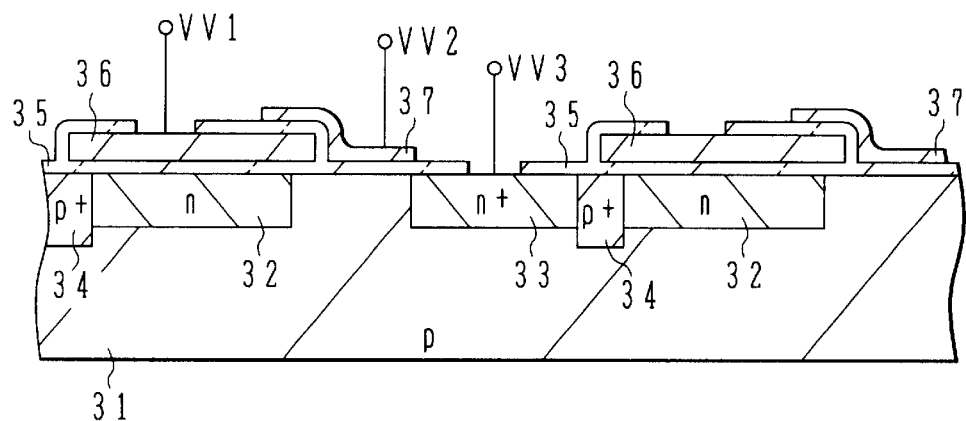
FIG. 20A is a cross sectional view of a substrate showing a drain region and its nearby region.

FIG. 20A is a cross sectional view of a substrate showing a drain D and its nearby area.

A p-type region 31 is a p-type well or p-type silicon layer of a silicon (semiconductor) substrate. In the surface layer of the p-type region 31, an n-type region 32 functioning as a vertical charge transfer path and an n$^+$-type region 33 functioning as a drain are formed. A p$^+$-type region 34 functioning as a channel stopper is formed between the n$^+$-type region 33 and right n-type region 32.

On a silicon oxide film (insulating film) 35 formed on the surface of the n-type region 32, a polysilicon layer 36 is formed. This polysilicon layer 36 is a transfer electrode used for driving the last stage of the vertical charge transfer path. The transfer electrode 36 is supplied with a pulse voltage VV1. By controlling the pulse voltage VV1, charges can be transferred from the vertical charge transfer path 32 to a horizontal charge transfer path.

On the silicon oxide film 35 formed on the p-type region 31 between the vertical charge transfer path 32 and drain 33, a polysilicon layer 37 is formed which is used as a drain control electrode for controlling the drain to turn on and off. The control electrode 37 is supplied with a pulse voltage VV2. The drain 33 is supplied with a predetermined positive voltage VV3 (e.g., 15 to 20 V). The control electrode 37, n-type region 32, and n$^+$-type region 33 constitute an n-channel MOS transistor. If the pulse voltage VV2 is 0 V, the transistor turns off and electric charges on the vertical charge transfer path 32 are transferred to the horizontal charge transfer path. At this time, the drain is turned off. If the pulse voltage VV2 takes a positive potential (e.g., 10 to 15 V), the transistor turns on and electric charges on the vertical charge transfer path 32 are drained from the drain 33. At this time, the drain is turned on.

Figure 20B:
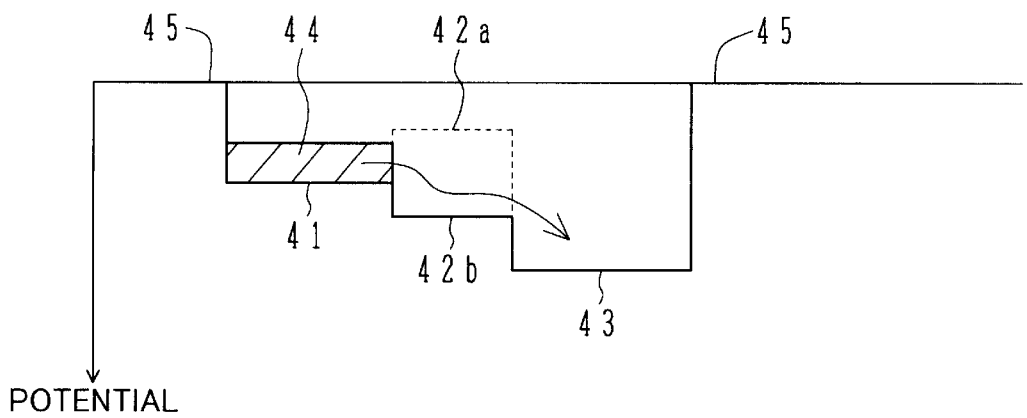
FIG. 20B is a graph showing potentials of the drain region and its nearby region.

FIG. 20B is a graph showing potentials at the drain and its nearby area. The abscissa represents a position in the horizontal direction of the substrate shown in FIG. 20A, and the ordinate represents a potential relative to an electron. The potential is lower at the downward position of the ordinate.

A potential 41 is a potential of the vertical transfer path (n-type region) 32 (FIG. 20A). A potential 43 is a potential of the drain (n$^+$-type region) 33 (FIG. 20A). A potential 45 is a potential of the p$^+$-type region 34 (FIG. 20A). A high potential 42a indicated by a broken line is a potential of the p-type region 31 under the control electrode 37 when the pulse voltage VV2 is 0 V. A low potential 42b indicated by a solid line is a potential of the p-type region 31 under the control electrode 37 when the pulse voltage VV2 takes a positive voltage (e.g., 10 to 15 V).

When the pulse voltage VV2 is 0 V, the high potential 42a functions as a barrier and electric charges (electrons) 44 in the vertical charge transfer path 32 are not drained from the drain 33. The electric charges 44 are shown hatched. Namely, the drain is turned off. When the pulse voltage VV2 takes a predetermined positive voltage, the charges 44 in the vertical charge transfer path 32 is drained from the drain 33 via the low potential region 42b. Namely, the drain is turned on.

Figure 15:
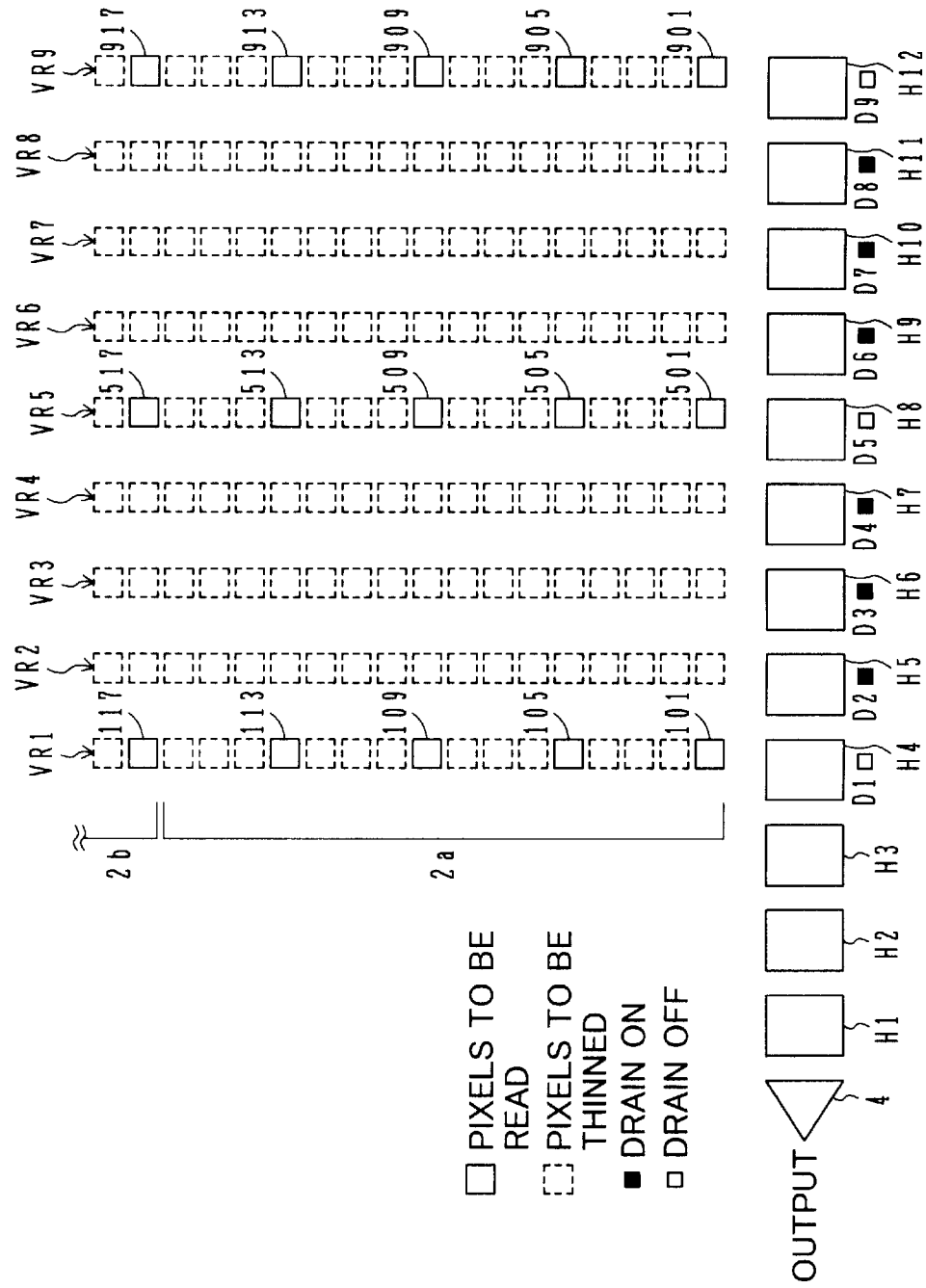
FIG. 15 is a plan view of another solid-state image pickup device having different drain positions.

The drain D shown in FIG. 7 is provided between the vertical transfer path VR and horizontal transfer stage H. As shown in FIG. 15, the drain D may be provided under the horizontal transfer stage H at the position corresponding to the vertical transfer path VR. In this case, it is necessary to drain electric charges on the vertical transfer path VR from the drain D via the empty packet of the horizontal transfer stage H.

Figure 16:
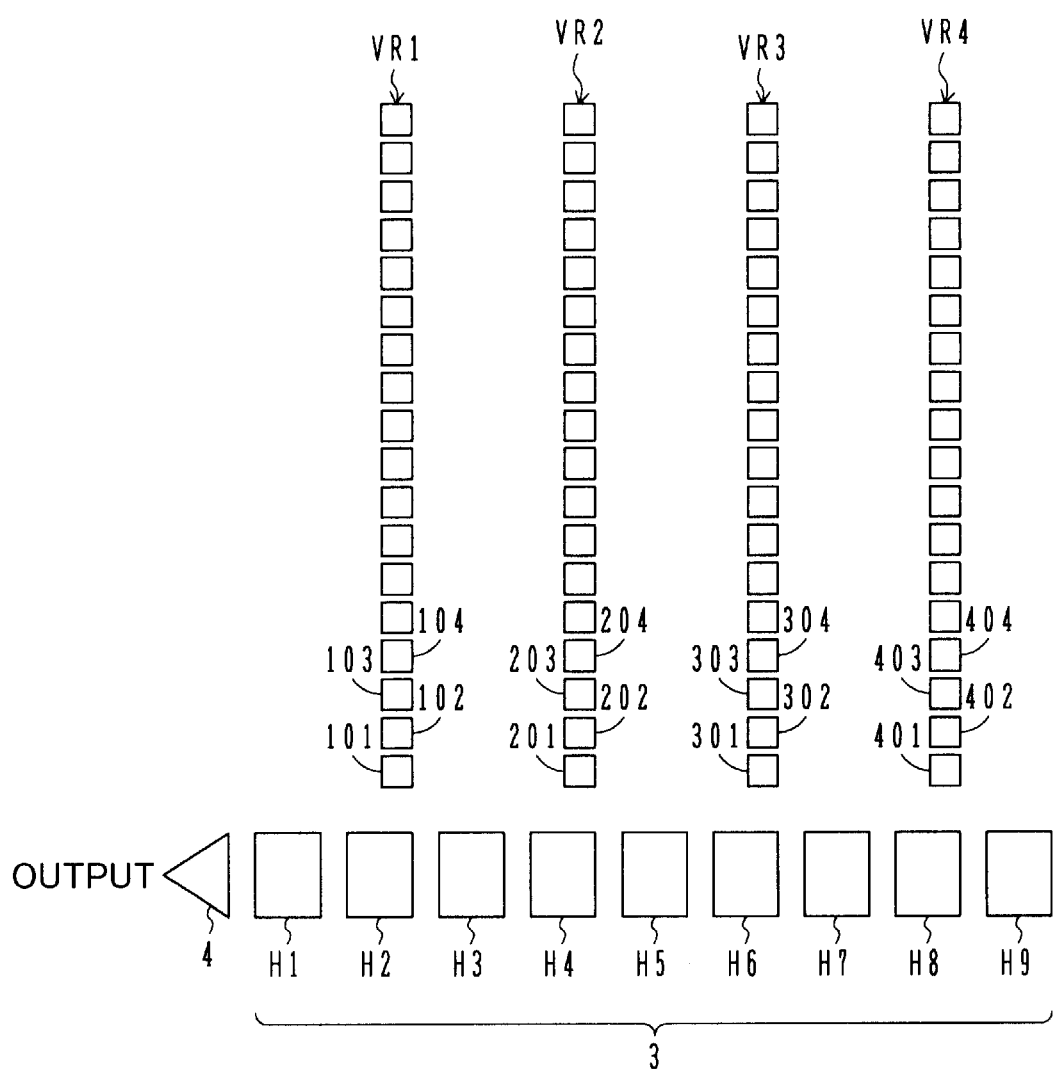
FIGS. 16 and 17 are plan views of a solid-state image pickup device having no drain.

FIG. 16 shows an example of a solid-state image pickup device having no drain. A horizontal transfer path 3 has horizontal transfer stages H1 to H9. Vertical transfer paths VR1, VR2, VR3, and VR4 are coupled to even horizontal transfer stages H2, H4, H6, and H8. Namely, two horizontal transfer stages H are assigned to one vertical transfer path VR.

Next, a read operation by non-interlace scanning will be described with reference to FIG. 17. Electric charges on the vertical transfer path VR are transferred by one stage in the vertical direction to transfer the electric charges 101, 201, 301, and 401 to horizontal transfer stages H2, H4, H6, and H8. Next, the electric charges on the horizontal transfer path 3 are transferred by one stage in the horizontal direction. Next, electric charges on the vertical transfer path VR are transferred by one stage in the vertical direction to transfer the electric charges 102, 202, 302, and 402 to horizontal transfer stages H2, H4, H6, and H8.

Figure 17:
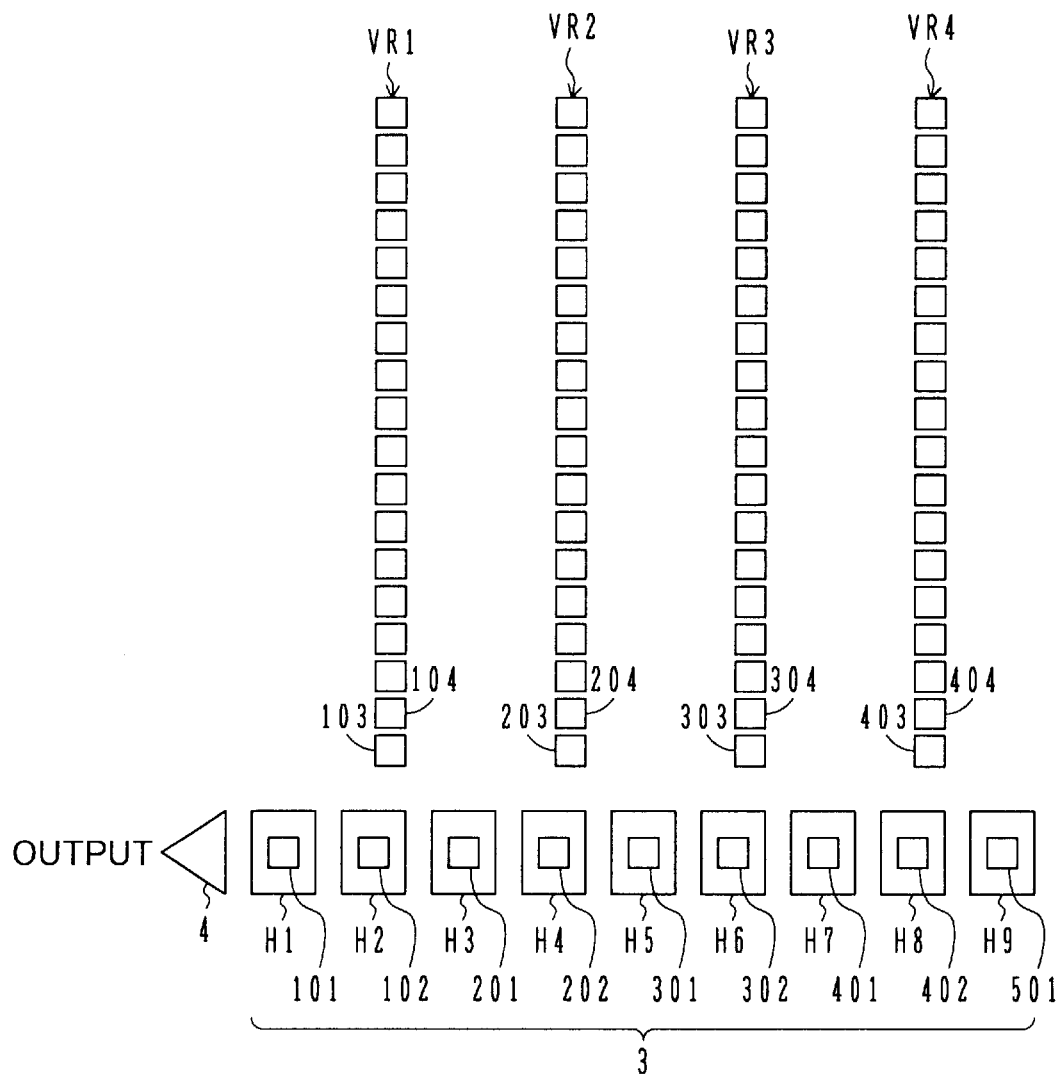
Figure 19A:
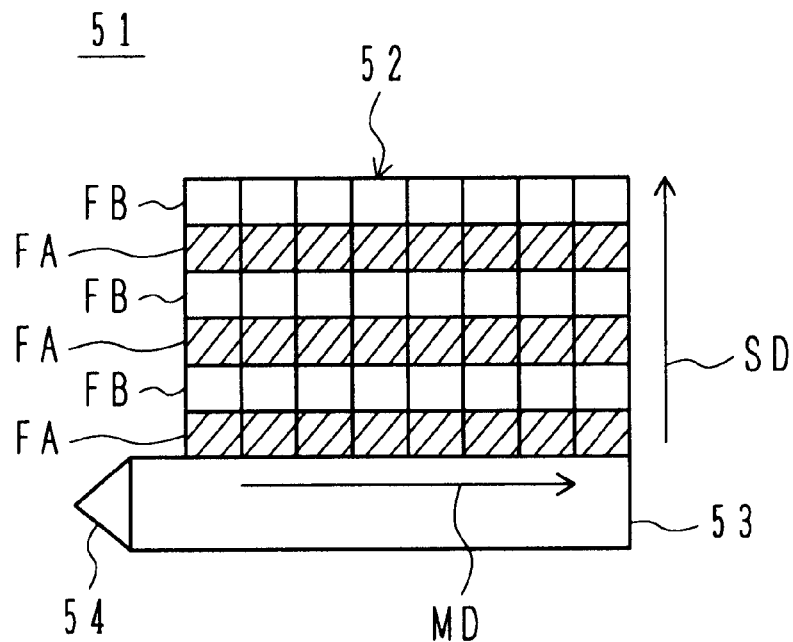
FIG. 19A illustrates interlace-scanning of the solid-state image pickup device shown in FIG. 18.
Figure 19B:
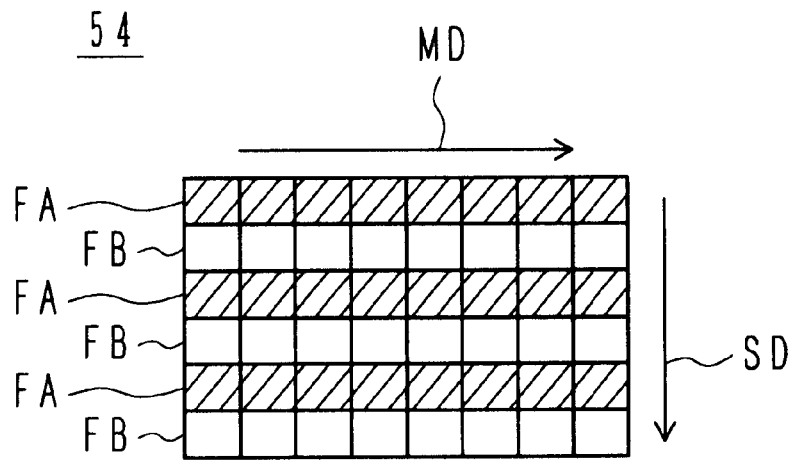
FIG. 19B illustrates interlace-scanning of the monitor shown in FIG. 18.

The electric charges 101, 102, 201, 202, 301, 302, 401, 402, and 501 are therefore stored in the horizontal transfer stages H1 to H9 as shown in FIG. 17. In this state, the horizontal transfer path 3 is driven to output all the electric charges on the horizontal transfer path 3 to an amplifier 4. Thereafter, the above operations are repeated to read an image of one frame.

In the solid-state image pickup device, n horizontal transfer stages H are assigned to one vertical transfer path VR. n is an integer of 2 or larger. Since n electric charges can be transferred on the horizontal transfer path 3 at the same time in the horizontal direction, electric charges can be transferred efficiently.

The present invention has been described in connection with the preferred embodiments. The invention is not limited only to the above embodiments. It is apparent that various modifications, improvements, combinations, and the like can be made by those skilled in the art.

What is claimed is:

1. A solid-state image pickup device comprising:
   a plurality of first transfer paths each having a plurality of transfer stages each capable of storing electric charges and transferring the electric charges in a first direction;
   a second transfer path having a plurality of transfer stages each capable of storing electric charges, receiving electric charges in the plurality of first transfer paths, and transferring the electric charges in a second direction;
   charge transfer means for transferring electric charges of two packets or more stored in different transfer stages of at least one first transfer path among the plurality of first transfer paths, to different transfer stages of the second transfer path, and transferring the electric charges of the two packets or more in the second transfer path in the second direction by separating the electric charges of the two packets or more; and
   a plurality of drains for controlling whether the electric charges in the plurality of first transfer paths are to be transferred to the second transfer path by selectively draining the electric charges;
   wherein the first transfer paths are assigned to first and second fields, and the solid-state image pickup device further comprises interlace-scanning charge transfer means for, in the first field, supplying the electric charges in the first transfer paths of the first field to the second transfer path and draining the electric charges in the first transfer paths of the second field from the drains and for, in the second field, supplying the electric charges in the first transfer paths of the second field to the second transfer path and draining the electric charges in the first transfer paths of the first field from the drains.

2. A solid-state image pickup device comprising:
   first transfer paths capable of transferring electric charges in a first direction;
   a second transfer path capable of receiving the electric charges in the first transfer paths and transferring the electric charges in a second direction; and
   a plurality of drains for controlling whether the electric charges in the first transfer paths are to be transferred to the second transfer path by selectively draining the electric charges,
   wherein the first transfer paths are assigned to first and second fields, and the solid-state image pickup device further comprises interlace-scanning charge transfer means for, in the first field, supplying the electric charges in the first transfer paths of the first field to the second transfer path and draining the electric charges in the first transfer paths of the second field from the drains and for, in the second field, supplying the electric charges in the first transfer paths of the second field to the second transfer path and draining the electric charges in the first transfer paths of the first field from the drains.

3. A charge transfer method comprising first transfer paths capable of transferring electric charges in a first direction and a second transfer path capable of transferring electric charges in a second direction, wherein when the electric charges in the first transfer paths to the second transfer path, whether the electric charges in the first transfer paths are to be transferred to the second transfer path is controlled by selectively draining from drains the electric charges transferred from the first transfer paths,
   wherein the first transfer paths are assigned to first and second fields, and the charge transfer method comprises the step of, in the first field, supplying the electric charges in the first transfer paths of the first field to the second transfer path and draining the electric charges in the first transfer paths of the second field from the drains and, in the second field, supplying the electric charges in the first transfer paths of the second field to the second transfer path and draining the electric charges in the first transfer paths of the first field from the drains.

\* \* \* \* \*